(12) United States Patent
Dockery et al.

(10) Patent No.: US 9,771,496 B2
(45) Date of Patent: Sep. 26, 2017

(54) TUNGSTEN-PROCESSING SLURRY WITH CATIONIC SURFACTANT AND CYCLODEXTRIN

(71) Applicant: Cabot Microelectronics Corporation, Aurora, IL (US)

(72) Inventors: Kevin Dockery, Aurora, IL (US); Helin Huang, Aurora, IL (US); Lin Fu, Naperville, IL (US); Tina Li, Warrenville, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 0 days.

(21) Appl. No.: 14/924,997

(22) Filed: Oct. 28, 2015

(65) Prior Publication Data

US 2017/0121560 A1    May 4, 2017

(51) Int. Cl.
  *C09G 1/02*   (2006.01)
  *B24B 37/24*  (2012.01)
  *C23F 3/04*   (2006.01)

(52) U.S. Cl.
  CPC ............... *C09G 1/02* (2013.01); *B24B 37/24* (2013.01); *C23F 3/04* (2013.01)

(58) Field of Classification Search
  None
  See application file for complete search history.

(56) References Cited

U.S. PATENT DOCUMENTS

| | | | |
|---|---|---|---|
| 6,576,261 B1 | 6/2003 | Pitha | |
| 7,695,637 B2 | 4/2010 | Park et al. | |
| 8,372,304 B2* | 2/2013 | Yamada | C09G 1/02 252/79.1 |
| 8,529,787 B2* | 9/2013 | Higuchi | C01B 33/14 252/79.1 |
| 2004/0266183 A1* | 12/2004 | Miller | C09G 1/02 438/687 |
| 2006/0243702 A1* | 11/2006 | Minamihaba | C09G 1/02 216/88 |
| 2007/0128873 A1* | 6/2007 | Minamihaba | C09G 1/02 438/692 |
| 2007/0232068 A1* | 10/2007 | Minamihaba | C09G 1/02 438/692 |
| 2009/0311864 A1* | 12/2009 | Yamada | C09G 1/02 438/693 |
| 2011/0059680 A1* | 3/2011 | Motonari | C09G 1/02 451/36 |
| 2012/0083123 A1* | 4/2012 | Chang | H01L 21/31053 438/693 |
| 2013/0327977 A1* | 12/2013 | Singh | H01L 21/30625 252/79.1 |
| 2014/0017892 A1* | 1/2014 | Ward | H01L 21/31116 438/693 |
| 2015/0159047 A1* | 6/2015 | Yoshida | C09G 1/02 438/693 |
| 2015/0184028 A1* | 7/2015 | Jung | C09G 1/02 438/692 |
| 2015/0376463 A1* | 12/2015 | Fu | C09G 1/02 438/693 |

FOREIGN PATENT DOCUMENTS

WO    2004026983 A1    4/2004

* cited by examiner

*Primary Examiner* — Allan Olsen
(74) *Attorney, Agent, or Firm* — Thomas Omholt; Erika S. Wilson; Daniel C. Schulte

(57) ABSTRACT

Described are chemical-mechanical polishing compositions (e.g., slurries) and methods of using the slurries for chemical-mechanical polishing (or planarizing) a surface of a substrate that contains tungsten, the compositions containing cationic surfactant and cyclodextrin.

22 Claims, No Drawings

TUNGSTEN-PROCESSING SLURRY WITH CATIONIC SURFACTANT AND CYCLODEXTRIN

FIELD OF THE INVENTION

The invention relates to slurries useful in methods for chemical-mechanical polishing (or planarizing) a surface of a substrate that contains a metal, especially tungsten.

BACKGROUND

Methods, materials, and equipment useful in chemical-mechanical polishing (CMP) or planarizing of a substrate are highly varied and are used for processing a wide range of substrates having different surfaces and end applications. Substrates that are processed by CMP methods include optical products and semiconductor substrates at any of various stages of fabrication. A wide range of CMP apparatuses, slurries, polishing pads, and methods are well known, with new products being developed on a continuing basis.

Various compositions (also known as polishing slurries, CMP slurries, and CMP compositions) are designed to process (e.g., polish, planarize) a surface of a semiconductor substrate. Some such surfaces contain a metal such as tungsten. A polishing slurry may contain chemical ingredients that are selected specifically for processing a certain type of substrate, such as for polishing a tungsten-containing surface as opposed to a surface that does not contain a metal or that contains a metal different from tungsten. Examples of such chemical ingredients include chemical catalysts, inhibitors, chelating agents, surfactants, oxidants, and others; each of these may be selected to improve desired processing of a metal or non-metal component of a substrate surface. In addition, the polishing composition typically contains abrasive particles. The type of abrasive particles may also be selected based on the type of substrate being processed. Certain types of abrasive particles may be useful in polishing a tungsten-containing substrate surface but may not be useful for processing other CMP substrate surfaces.

Some slurries are designed for processing a surface that is made entirely of a single material, such as a continuous metal or a continuous dielectric material. Other slurries can be designed to process a substrate that has features made from a combination of different materials, e.g., a surface having metal features dispersed throughout a dielectric material.

Methods of polishing tungsten-containing substrates have become important for advanced nodes of semiconductor processing. In steps of preparing tungsten features of a substrate, a starting substrate can include a surface of patterned (non-planar) non-tungsten (e.g., dielectric) material that contains three-dimensional spaces such as channels, holes, gaps, trenches, and the like, that require filling with tungsten. The tungsten can be deposited over the patterned material in a manner to not only fill the spaces, but to also produce a continuous layer of excess tungsten over the discontinuous surface to ensure complete filling of the spaces. The excess tungsten must later be removed to expose a surface of the original patterned material with tungsten features deposited into the spaces between the patterned material.

One example of a substrate that has tungsten (or another metal) features disposed between dielectric features is a semiconductor substrate that includes tungsten "plug" and "interconnect" structures provided between features of dielectric material. To produce such structures, tungsten is applied over a surface that contains a patterned structure made at least in part from dielectric material, e.g., silicon oxide. The patterned dielectric surface is structured, i.e., non-planar, meaning that it includes a surface that is substantially flat or planar except for being interrupted and made discontinuous by the presence of the spaces such as holes, channels, trenches, or the like. When tungsten is applied to the structured dielectric-containing surface, the spaces are filled with the tungsten and a continuous layer of excess tungsten is also formed. A next step is to remove the excess tungsten to expose the underlying dielectric layer and to produce a planar surface of the metal disposed within the spaces of the dielectric material.

By some methods, tungsten is removed in a single step that uncovers the dielectric surface. By other methods, a "two-step" process can be used. In a first step a large portion of the excess tungsten is removed but the dielectric layer is not exposed. This step is commonly referred to as a "bulk" removal step, during which a high tungsten removal rate is desired. A subsequent (second) step can be used to remove a final portion of the remaining tungsten and to eventually expose the underlying dielectric material with tungsten filling the spaces between dielectric features. This step is sometimes referred to as a "polishing" step, wherein a high tungsten removal rate may be important, but wherein other performance requirements are important too.

A polishing step affects both tungsten and dielectric features of a substrate. The end condition of both types of features must exhibit both acceptable planarity and "topography."

Topography characteristics of a polished substrate include physical phenomena referred to as "erosion" of oxide and "dishing," of the metal, and their combined effect, which is referred to as "step height." In one type of pattern, commonly referred to as a line and space (L&S) pattern, the pattern includes line arrays of metal and oxide, such a silicon oxide, in fields of dielectric material such as silicon oxide. The line arrays may be of any density or size, for example alternating 1 micron-wide lines of metal and 1 micron-wide lines of oxide, i.e., a 50% 1 micron array, or alternating lines of different size or density, for example of 1 micron-wide lines of metal and 3 micron-wide lines of oxide, i.e., a 25% 1×3 micron array.

A dielectric field, for comparison, is typically larger in dimension and is comprised of a dielectric material such as a silicon oxide such as TEOS. For example, the field can be a 100 um×100 um area. To evaluate post-polishing pattern performance the absolute oxide loss (material removed) in the field is determined, such as by an optical method using commercially available equipment. The field is used as a reference for the relative pattern measurements of dishing and erosion in the arrays. For example, a 50% 1×1 micron line array comprised of alternating tungsten metal and TEOS oxide lines, can be measured by profilometry or AFM with respect to the field oxide. Erosion is characterized by a difference in the relative height of the oxide, such as the 1 micron TEOS lines, in the line array, as compared to the field oxide. A positive erosion value is interpreted as relative recess of the oxide lines as compared to the field. Metal dishing typically refers to the relative height of the metal lines as compared to the oxide lines in the array. For example in the 50% 1×1 micron line array, a value of 200 Angstroms dishing is interpreted as 200 Angstrom recess of the tungsten lines relative to the oxide lines. Adding the erosion and the dishing provides the total stepheight, in this case from the recessed (dished tungsten) to the field oxide. Total oxide or metal loss in the array can be determined by combining the dishing and erosion values with the absolute oxide loss values determined for the field, as discussed above.

A commercial CMP polishing process can preferably be effective to remove an amount of metal (e.g., tungsten) without producing unacceptable erosion, dishing, or other undesired topography effects at the substrate surface, and with low levels of defects such as scratches and residue.

In view of the above, there is ongoing need in the semiconductor processing industry for a CMP slurry useful for polishing a tungsten-containing substrate, that provides useful or improved performance in areas of: planarity of a polished surface, reduced topography defects including dishing and erosion, and other reduced defects in a polished surface such as reduced scratching and reduced residue, while still providing useful or high removal rates for tungsten and oxide (e.g., TEOS).

SUMMARY

The present inventors have discovered new and inventive polishing compositions for processing surfaces of tungsten-containing substrates by chemical mechanical polishing techniques, these compositions sometimes being referred to herein as "slurry compositions," "CMP slurries," "slurries" "chemical mechanical polishing slurries," "CMP compositions" or the like. The novel polishing compositions contain liquid carrier (e.g., water), abrasive particles, cyclodextrin, and cationic surfactant. The cationic surfactant is capable of forming a complex with the cyclodextrin while in the polishing composition.

In the past, cationic surfactants have been found to be not useful in various CMP compositions because cationic surfactants may cause instability of abrasive particles, especially charged particles such as charged colloidal silica particles, and also because cationic surfactants in a CMP slurry can tend to produce high levels of defects during CMP processing. According to the present description, select cationic surfactants can be useful in a CMP slurry with abrasive particles that may even include charged colloidal silica particles, without causing a high level of defectivity and without causing instability of the charged colloidal silica abrasive particles. When included in the slurry in combination with cyclodextrin, these cationic surfactants can be included at levels (concentrations) that are higher than levels at which the cationic surfactants can be included in a slurry that does not include cyclodextrin. The described slurries also exhibit other important performance properties such as desired removal rates and good or advantageously improved topography properties of a processed substrate.

In a polishing composition as described, one molecule of the cationic surfactant and one molecule of cyclodextrin become associated to form a "cyclodextrin-cationic surfactant complex," or "complex" for short. The cyclodextrin can be alpha-, beta-, or gamma-cyclodextrin. The cationic surfactant is of a type that is capable of forming the complex in the polishing composition, with the resultant slurry (containing the cationic surfactant, cyclodextrin, and complex) being effective to process (e.g., polish) a tungsten-containing surface of a substrate.

Examples of cationic surfactants that are capable of forming the complex with cyclodextrin include those that have a cation and a hydrophobic tail that extends from the cation, the tail including at least 7 carbon atoms. The tail can be a hydrocarbon, substituted hydrocarbon, or heteroatom-containing hydrocarbon group that is capable of associating with the cyclodextrin to form the complex. Preferred tail groups may be relatively hydrophobic and may be sterically adapted to associate with the cyclodextrin, e.g., linear or not unduly branched. Examples include straight-chain alkyl (un-substituted and uncharged) groups having no unsaturation or only slight unsaturation (e.g., 1 or 2 carbon-carbon double bonds). Also connected to the cation are hydrogen atoms or non-hydrogen groups that may be of any useful chemistry and structure, including straight chain alkyl, substituted or branched alkyl, or heteroatom (e.g., cation)-containing straight or branched alkyl, any of which may include unsaturation. Optionally the cation of the cationic surfactant may be part of a saturated or aromatic ring structure that contains the cation as a heteroatom, the ring also optionally being substituted.

In preferred embodiments, it has now been determined that including cyclodextrin in a polishing composition with cationic surfactant can advantageously allow for the presence of (or the presence of an increased amount of) cationic surfactant in a slurry, without causing undue detrimental effects. Cationic surfactant have been identified as potentially useful in a CMP slurry to improve desired topography properties (reduced erosion, dishing). But, many chemical compounds such as cationic compounds may also negatively affect removal rate of tungsten or oxide, or may result in instability of suspended particles, such as by causing settling of particles during storage, or particle size growth during storage or use.

According to the present description, the presence of cyclodextrin has been found to allow for the presence of cationic surfactant in a polishing composition, with reduced negative effects. In certain embodiments of the described slurries, cationic surfactant can be included in an amount that produces a desired or improved performance effect such as reduced dishing or erosion, but without also producing an undue detrimental effect such as undue instability of the slurry during storage or during use, or reduction in a different performance feature such as a reduced removal rate or increased level of defectivity of a processed substrate. Preferred cationic surfactant can produce improvements in topography (e.g., erosion or dishing), and when present with cyclodextrin, can do so without detrimentally affecting other physical or performance properties of the slurry, e.g., will not result in: a tungsten or oxide removal rate that is unsuitably reduced or low; reduced stability of the slurry either during storage or during use, for example as measured by settling of particles during storage or increased particle size growth during storage or use; or increased defectivity in the form of scratching or residue present on a processed wafer surface.

Polishing compositions as described are useful for processing (e.g., polishing or buffing) a tungsten-containing substrate surface. The polishing compositions include the cationic surfactant, cyclodextrin, the complex, abrasive particles dispersed in an aqueous medium, and optionally one or more of catalyst, stabilizer, inhibitor, or other optional minor ingredients. Preferred polishing compositions, when used in CMP polishing of a tungsten-containing substrate, show a desired combination of good removal rate of tungsten, and of dielectric material (e.g., TEOS or other oxide material); useful or low levels of defectivity including low levels of scratching, residue, or preferably both; and useful or advantageous topography properties including low levels of dishing and erosion. Preferred polishing compositions can exhibit improved stability, e.g., during use, by showing a reduced level of particle size growth during a planarization or polishing process, which results in a reduced level of defects in the form of scratching of a processed substrate;

this can be particularly true for stabilizing (non-permanently) positively charged colloidal silicas. In certain particularly preferred polishing compositions, one or more of these performance properties can be improved relative to the same performance property of an otherwise identical polishing composition that does not contain the cyclodextrin, cationic surfactant, and the cyclodextrin-cationic surfactant complex.

Examples of preferred abrasive particles include positively-charged silica particles that can have a positive charge at a surface of the particle, a positive charge at the interior of the particle, or both, and that can preferably exhibit a positive charge of at least 6, e.g., at least 8 millivolts, the charge preferably being permanent. The polishing slurry can include particles that are non-agglomerated, that are agglomerated, or both, e.g., at least 30, 40, or 50 percent agglomerated particles. Other types and forms of abrasive particles may also be useful, including, e.g., metal oxide particles, ceria particles, zirconia particles, or others as desired.

Also described are methods for chemical mechanical polishing a substrate that includes a surface that contains tungsten. The method includes contacting the substrate with a polishing composition as described herein, moving the polishing composition relative to the substrate, and abrading the substrate to remove a portion of the tungsten from the substrate and thereby polish the substrate.

In one aspect, the invention relates to a polishing composition useful for processing a tungsten-containing surface. The polishing composition includes: liquid carrier, abrasive particles dispersed in the liquid carrier, cyclodextrin selected from alpha-, beta-, gamma-cyclodextrin, or a combination thereof, and cationic surfactant having a cation and a hydrophobic tail that extends from the cation and that includes a chain comprising at least 7 carbon atoms. The cationic surfactant is capable of forming a complex with the cyclodextrin in the slurry.

In another aspect, the invention relates to a method of chemical mechanical polishing a substrate that includes a surface that includes tungsten. The method includes contacting the substrate with a polishing composition that contains: liquid carrier; silica abrasive particles dispersed in the liquid carrier, the particles having a positive charge of at least 6 millivolts (mV) in the slurry at a pH of from 1 to 6; cyclodextrin selected from alpha-, beta-, or gamma-cyclodextrin; and cationic surfactant having a cation and a hydrophobic end extending from the cation; the cationic surfactant is capable of forming a complex with the cyclodextrin, in the polishing composition. The method also includes moving the slurry relative to the substrate and abrading the substrate to remove a portion of the tungsten from the substrate.

DETAILED DESCRIPTION

Described as follows are chemical mechanical polishing compositions useful for CMP processing (planarization, polishing) of a tungsten-containing substrate. These polishing compositions may be referred to herein as "CMP slurries," "polishing slurries," "tungsten-polishing slurries," "polishing compositions," "composition," "planarization compositions" and the like. The polishing composition includes liquid carrier, abrasive particles (preferably positively-charged colloidal silica abrasive particles) dispersed in the liquid carrier, cationic surfactant, and cyclodextrin. Optionally and preferably the polishing composition may also contain other additives or minor ingredients such as catalyst, oxidant, inhibitor, a pH-adjuster, among others.

The abrasive particles can be any type of abrasive particles useful in a chemical mechanical polishing. Examples include various forms of: zirconia; metal oxides such as alumina; ceria; and silica; any of these may be doped, undoped, or prepared by any of various known methods for the different types of particles. Preferred abrasive particles include colloidal silica particles, especially colloidal silica particles that exhibit a positive charge in the environment of the slurry.

As used herein, the term "colloidal silica particles" refers to silica particles prepared using a wet process (precipitated or condensation-polymerized silica) rather than a pyrogenic or flame hydrolysis process, which produces structurally different particles. The charged colloidal silica abrasive particles are dispersed or suspended throughout the liquid carrier. Various types of colloidal silica particles (e.g., charged, agglomerated, non-charged, non-agglomerated) are well known and available commercially.

When present in the polishing composition, the colloidal silica abrasive particles can preferably exhibit a positive charge. Also when present in the polishing composition, the charged colloidal silica abrasive particles can optionally and preferably include particles that are agglomerated and particles that are non-agglomerated. Non-agglomerated particles are individual particles that may be spherical or nearly spherical in shape, but can have other shapes as well such as generally elliptical, square, or rectangular cross-sections. The non-aggregated particles are referred to as primary particles. Aggregated particles are particles in which multiple discrete primary particles, not too many in number (e.g., 2, 3, 4, or 5 primary particles), have become clustered or bonded together to form a single particle from the multiple particles, the single particle having a generally irregular shape.

Various embodiments of positively-charged and optionally agglomerated colloidal silica particles are described in Applicant's copending U.S. patent applications Ser. No. 14/222,086 filed on Mar. 21, 2014, Ser. No. 14/222,736 filed on Mar. 24, 2014, and Ser. No. 14/750,204 filed on Jun. 24, 2015, and in U.S. granted Pat. No. 9,127,187. Charged colloidal silica abrasive particles described in those patent applications may be useful in a polishing composition as presently described, and may be agglomerated or non-agglomerated. A polishing composition as described, prior to being used in a CMP process, may include aggregated colloidal silica particles, non-aggregated colloidal silica particles, or both. Aggregated particles may be present at a level that is useful or advantageous but not excessive, i.e., at a level that does not result in a high level of defects such as scratches during processing. In certain embodiments, positively-charged colloidal silica particles of a polishing composition (prior to use in a CMP process) may be partially aggregated. For example, up to 30, 40, or 50 percent of the dispersed colloidal silica particles in the polishing composition can include three or more aggregated primary particles, e.g., three, four, or five aggregated primary particles, the remainder or substantial remainder of the particles being present in the form of primary particles. The agglomerated particles are of a size and concentration that are not sufficiently high to cause a high level of defects such as scratching, during processing. For example, the agglomerated particles can mostly be agglomerated particles that contain not more than 10 primary particles; alternately stated, most of the agglomerated particles are preferably smaller than 0.5 μm (microns) (i.e., 500 nm).

The particle size of an abrasive particle is the diameter of the smallest sphere that encompasses the particle. Particles in a partially aggregated dispersion may have any suitable particle size, e.g., an average particle size (aggregate size) in a range from about 5 to about 150 nm. The abrasive particles may have an average particle size (aggregate size) of about 20 nm or more (e.g., about 25 nm or more, about 30 nm or more, about 40 nm or more, or about 45 nm or more). The abrasive particles may have an average particle size (aggregate size) of about 100 nm or less (e.g., about 90 nm or less, about 80 nm or less, about 70 nm or less, or about 65 nm or less). Accordingly, the abrasive particles may have an average particle size (aggregate size) in a range from about 20 nm to about 90 nm (e.g., from about 25 nm to about 90 nm, or from about 30 nm to about 90 nm). Preferably, the abrasive particles can have an average particle size in a range from about 40 to about 70 nm or in a range from about 45 to about 65 nm. Particle size of colloidal silica particles may be measured using a dynamic light scattering tool such as the Zetasizer® available from Malvern Instruments® (Worcestershire, UK).

The polishing composition may include any suitable amount of abrasive particles, e.g., charged colloidal silica abrasive particles. Preferred polishing compositions may include about 0.01 weight percent or more colloidal silica (e.g., about 0.05 weight percent or more). More typically, a preferred polishing composition may include about 0.1 weight percent or more (e.g., about 1 weight percent or more, about 5 weight percent or more, about 7 weight percent or more, about 10 weight percent or more, or about 12 weight percent or more) colloidal silica particles. The amount of colloidal silica particles may be about 30 weight percent or less, and more typically about 20 weight percent or less (e.g., about 15 weight percent or less, about 10 weight percent or less, about 5 weight percent or less, about 3 weight percent or less, or about 2 weight percent or less). Preferably, the amount of colloidal silica particles in the polishing composition is in a range from about 0.01 weight percent to about 20 weight percent, and more preferably from about 0.05 weight percent to about 15 weight percent (e.g., from about 0.1 weight percent to about 10 weight percent, from about 0.1 weight percent to about 4 weight percent, from about 0.1 weight percent to about 3 weight percent, from about 0.1 weight percent to about 2 weight percent, or from about 0.2 weight percent to about 2 weight percent).

Preferred colloidal silica particles have a positive charge of at least 6, e.g., at least 8 millivolts (mV) in the polishing composition. The charge on dispersed particles such as colloidal silica particles is commonly referred to as the zeta potential (or the electrokinetic potential). The zeta potential of a particle refers to the electrical potential difference between the electrical charge of the ions surrounding the particle and the electrical charge of the bulk solution of the polishing composition (e.g., the liquid carrier and any other components dissolved therein). The zeta potential is typically dependent on the pH of the aqueous medium. For a given polishing composition, the isoelectric point of the particles is defined as the pH at which the zeta potential is zero. As the pH is increased or decreased away from the isoelectric point, the surface charge (and hence the zeta potential) is correspondingly decreased or increased (to negative or positive zeta potential values). The zeta potential of the polishing composition may be obtained using the Model DT-1202 Acoustic and Electro-acoustic spectrometer available from Dispersion Technologies, Inc. (Bedford Hills, N.Y.).

Exemplary colloidal silica particles may have a positive charge of about 6 mV or more (e.g., about 8 or 10 mV or more, about 15 mV or more, about 20 mV or more, about 25 mV or more, or about 30 mV or more), when in the slurry. The colloidal silica particles in the slurry may have a positive charge of about 50 mV or less (e.g., about 45 mV or less, about 40 mV or less, or about 35 mV or less). Preferably, the colloidal silica particles have a positive charge in a range from about 6 mV to about 50 mV (e.g., about 10 mV to about 45 mV, about 15 mV to about 40 mV, or about 20 mV to about 40 mV).

The positive charge of the colloidal silica particles may be permanent, meaning that the charge is not readily reversible, for example, by flushing, dilution, filtration, or the like. A permanent positive charge may be the result, for example, of incorporating a cationic compound onto or within the interior portion of the particle, below an outer surface of the particle. The cationic compound may include, for example, a metal cation, a nitrogen-containing compound such as an amine, a phosphonium compound, or a combination of two or more of these. A permanent positive charge may result, for example, from a covalent interaction between the particle and the cationic compound and is in contrast to a reversible positive charge that may be the result, for example, of an electrostatic interaction between the particle and the cationic compound. It will be understood that the present disclosure is not limited to any particular means of obtaining a permanent positive charge.

Notwithstanding, as used herein, a permanent positive charge of at least 6 mV (e.g., 8 mV, or higher) means that the zeta potential of the colloidal silica particles remains above 6 mV (or higher) after the following a three step filtration test. A volume of the polishing composition (e.g., 200 ml) is filtered through a Millipore Ultracell regenerated cellulose ultrafiltration disk (e.g., having a MW cutoff of 100,000 Daltons and a pore size of 6.3 nm). The remaining dispersion (the approximately 65 ml of dispersion that is retained by the ultrafiltration disk) is collected and replenished with pH adjusted deionized water. The deionized water is pH adjusted to the original pH of the polishing composition using a suitable inorganic acid such as nitric acid. This procedure is repeated for a total of three filtration cycles. The zeta-potential of the triply filtered and replenished dispersion is then measured and may be compared with the zeta potential of the original polishing composition.

While wishing to not be bound by theory, it is believed that the dispersion retained by the ultrafiltration disk (the retained dispersion) includes the silica particles and any chemical components (e.g., the positively-charged species) that may be in the particles or associated with the surface of the particles (e.g., bonded, attached, electrostatically interacting, or in contact with the particle surface). At least a portion of the liquid carrier and the chemical components dissolved therein pass through the ultrafiltration disk. Replenishing the retained dispersion to the original volume is believed to upset the equilibrium in the original polishing composition such that the chemical components associated with the particle surface may tend toward a new equilibrium. Components that are internal to the particle or are strongly associated (e.g., covalently bonded) with the particle surface remain with the particle such that there tends to be little if any change in the positive zeta potential thereof. In contrast, a portion of components that have a weaker association (e.g., an electrostatic interaction) with the particle surface may return to the solution as the system tends toward the new equilibrium, thereby resulting in a reduction in the positive zeta potential. Repeating this process for a total of three ultrafiltration and replenishing cycles is believed to amplify the above-described effect.

It is preferred that there is little difference between the zeta potential of the colloidal silica particles in the original polishing composition and the colloidal silica particles in the dispersion after the above-described three step filtration test (after correcting for ionic strength differences resulting from the filtration test). For example, it is preferred that the zeta potential of the colloidal silica particles in the original polishing composition is less than about 10 mV greater than the zeta potential of the colloidal silica particles after the three step filtration test (e.g., less than about 7 mV greater, less than about 5 mV greater, or even less than about 2mV greater). Stated another way it is preferred that the zeta potential of the colloidal silica particles after the three-step filtration test is less than 10 mV (or less than 7mV, or less than 5 mV, or less than 2 mV less) less than the zeta potential of the colloidal silica particles in the original polishing composition. For example, in an embodiment in which the zeta potential of the colloidal silica particles in the original polishing composition is 30 mV, the zeta potential of the colloidal silica particles after the three-step filtration test is preferably greater than 20 mV (or greater than 23 mV, or greater than 25 mV, or greater than 28 mV).

Colloidal silica particles and charged colloidal silica particles can be prepared by various methods, some examples of which are commercially used and known. Useful colloidal silica particles include precipitated or condensation-polymerized silica, which may be prepared using known methods, such as by methods referred to as the "sol gel" method or by silicate ion-exchange. Condensation-polymerized silica particles are often prepared by condensing $Si(OH)_4$ to form substantially spherical particles. The precursor $Si(OH)_4$ may be obtained, for example, by hydrolysis of high purity alkoxysilanes, or by acidification of aqueous silicate solutions. U.S. Pat. No. 5,230,833 describes a method for preparing colloidal silica particles in solution.

A partially aggregated dispersion in which 30 percent or more of colloidal silica particles in the dispersion include three or more aggregated primary particles may be prepared using a multi-step process in which primary particles are first grown in solution, for example as described in the '833 patent. The pH of the solution may then be adjusted to an acidic value for a predetermined time period to promote partial aggregation. An optional final step may allow for further growth of the aggregates (and any remaining primary particles). See Applicant's copending U.S. patent application Ser. No. 14/222,086, filed Mar. 21, 2014.

To provide colloidal silica particles that exhibit a positive charge, the particles may be prepared in a manner that includes placing at the particle surface, or at the particle interior, a chemical compound that is capable of exhibiting a positive charge, i.e., a cationic compound. For example, silica particles that exhibit a positive charge can be produced by placing a cationic compound at an external surface of the particles. CMP compositions that include this type of surface-charged colloidal silica abrasive particles are described, for example, in U.S. Pat. Nos.7,994,057 and 8,252,687.

In alternate embodiments, cationic compound can be incorporated into the interior of colloidal silica abrasive particles, below an outer surface. The cationic compound may be, for example, a nitrogen-containing compound or a phosphorous-containing compound, e.g., an aminosilane or a phosphonium silane compound. Examples of such interior-charged particles are described in Applicant's copending U.S. patent application Ser. No. 14/750,204, filed June 25, 2015.

When the cationic compound is a nitrogen-containing compound it preferably includes an amine compound or an ammonium compound. When the cationic compound is a phosphorus-containing compound, it preferably includes a phosphine compound or phosphonium compound. An ammonium compound may include $R^1R^2R^3R^4N^-$ and a phosphonium compound may include $R^1R^2R^3R^4P^+$, wherein each $R^1$, $R^2$, $R^3$, and $R^4$ independently represents hydrogen, $C_1$-$C_6$ alkyl, a $C_7$-$C_{12}$ arylalkyl, or a $C_6$-$C_{10}$ aryl. These groups can be further substituted with one or more hydroxyl groups.

Example ammonium compounds may include tetramethylammonium, tetraethylammonium, tetrapropylammonium, tetrabutylammonium, tetrapentylammonium, ethyltrimethylammonium, and diethyldimethylammonium. In certain embodiments, the ammonium compound is preferably not ammonia or ammonium ($NH_3$ or $NH_4^+$).

Example phosphonium compounds may include tetramethylphosphonium, tetraethylphosphonium, tetrapropylphosphonium, tetrabutylphosphonium, tetraphenylphosphonium, methyltriphenylphosphonium, ethyltriphenylphosphonium, butyltriphenylphosphonium, benzyltriphenylphosphonium, dimethyldiphenylphosphonium, hydroxymethyltriphenylphosphonium, and hydroxyethyltriphenylphosphonium. Example phosphonium compounds may also include a phosphonium silane compound.

A nitrogen-containing cationic compound may also include a substance having an amino group such as a primary amine, a secondary amine, a tertiary amine, or a quaternary amine compound. Such a nitrogen-containing cationic compound may include an amino acid, for example, an amino acid having from one to eight carbon atoms such as lycine, glutamine, glycine, iminodiacetic acid, alanine, valine, leucine, isoleucine, serine, and threonine.

Alternately the cationic compound may be an aminosilane compound. Such aminosilane compounds may include primary aminosilanes, secondary aminosilanes, tertiary aminosilanes, quaternary aminosilanes, and multi-podal (e.g., dipodal) aminosilanes. The aminosilane compound may include substantially any suitable aminosilane, for example, a propyl group containing aminosilane, or an aminosilane compound including a propyl amine. Examples of suitable aminosilanes may include bis(2-hydroxyethyl)-3-aminopropyl trialkoxysilane, diethylaminomethyltrialkoxysilane, (N,N-diethyl-3-aminopropyl)trialkoxysilane), 3-(N-styrylmethyl-2-aminoethylaminopropyl trialkoxysilane, aminopropyl trialkoxysilane, (2-N-benzylaminoethyl)-3-aminopropyl trialkoxysilane), trialkoxysilyl propyl-N,N,N-trimethyl ammonium chloride, N-(trialkoxysilylethyl) benzyl-N,N,N-trimethyl ammonium chloride, (bis (methyldialkoxysilylpropyl)-N-methyl amine, bis (trialkoxysilylpropyl)urea, bis(3-(trialkoxysilyl)propyl)-ethylenediamine, bis(trialkoxysilylpropyl)amine, bis (trialkoxysilylpropyl)amine, 3-aminopropyltrialkoxysilane, N-(2-Aminoethyl)-3-aminopropylmethyldialkoxysilane, N-(2-Aminoethyl)-3-aminopropyltrialkoxysilane, 3-Aminopropylmethyldialkoxysilane, 3-Aminopropyltrialkoxysilane, (N-Trialkoxysilylpropyl)polyethyleneimine, Trialkoxysilylpropyldiethylenetriamine, N-Phenyl-3-aminopropyltrialkoysilane, N-(Vinylbenzyl)-2-aminoethyl-3-aminopropyltrialkoxysilane hydrochloride, 4-Aminobutyltrialkoxysilane, and mixtures thereof. Those of ordinary skill in the art will readily appreciate that aminosilane compounds are commonly hydrolyzed (or partially hydrolyzed) in an aqueous medium. Thus by reciting an aminosilane compound, it will be understood that the aminosilane and/or a hydrolyzed (or partially hydrolyzed) species and/or condensed species thereof may be incorporated in the colloidal silica abrasive particles.

It will be understood that colloidal silica abrasive particles may include two or more of the above-described cationic compounds that may be: incorporated into the interiors of the particles, located at surfaces of the particles, or both. For example, in one embodiment of positively-charged colloidal silica particles, a first incorporated cationic compound may include an aminosilane compound and a second incorporated cationic compound may include an ammonium compound, such as a quaternary amine. In an embodiment in which the first cationic compound is an aminosilane compound and the second cationic compound is a quaternary amine, a molar ratio of the first cationic compound to the second cationic compound is preferably less than about 5 to 1.

By certain methods described in Applicant's copending patent application Ser. No. 14/750,204, filed Jun. 25, 2015, positively-charged colloidal silica abrasive particles may be prepared by steps that incorporate a cationic compound into the abrasive particles (i.e., the cationic compound becomes located below the surface of the particles at the interior of the particles). Colloidal silica abrasive particles having an internal cationic compound that provides a positive charge may be fabricated, for example, by growing the abrasive particles in a liquid solution containing the cationic compound such that the cationic compound becomes incorporated into at least a portion of the colloidal silica particles during growth thereof. Alternate embodiments of internal-charged colloidal silica particles may be prepared by treating a conventional colloidal silica particle with the cationic compound and then growing additional silica over the cationic compound to thereby cover the cationic compound with additional silica. While the cationic compound is incorporated internally in the colloidal silica abrasive particles, it will be understood that an amount of the cationic compound may also be at or near the particle surface such that the cationic compound is both internal to the surface and at the surface.

By one such embodiment, colloidal silica abrasive particles having an internal cationic compound may be prepared, for example, by (i) providing a liquid solution (e.g., including water at a predetermined pH) and (ii) combining the liquid solution with silica-producing compound and the cationic compound and causing colloidal silica particles to grow in the liquid solution such that a dispersion is obtained including colloidal silica particles having the cationic compound incorporated therein. The cationic compound may alternately be included in the liquid solution provided in (i). The silica-producing compound may include, for example, tetramethyl orthosilicate (TMOS), tetraethyl orthosilicate (TEOS), silicic acid, an alkali or ammonium silicate, or a silicon tetrahalide. This method is similar to that disclosed in U.S. Pat. No. 8,529,787 in which TMOS is continuously added to a mother liquid including an alkali catalyst (the similarity is that a silica producing compound is combined with a liquid solution to produce colloidal silica particles).

The cationic compound may be added to the liquid solution in substantially any suitable amount sufficient to incorporate the cationic compound into the colloidal silica particles (with the particles preferably—although not necessarily—including less than 10 weight percent of the cationic compound incorporated therein). The aqueous liquid solution may further optionally include an alkali catalyst, for example, including an ether amine, an ethylene amine, a tetraalkyl amine, an alcohol amine, or two or more of these. Suitable alkali catalysts may include an organic base catalyst such as ethylenediamine, diethylenetriamine, triethylenetetramine, ammonia, urea, monoethanolamine, diethanolamine, triethanolamine, tetramethylammonium hydroxide (TMAH), tetramethylguanidine, tetraethylammonium hydroxide, aminopropylmorpholine, hexyloxypropylamine, ethyloxypropylamine (EOPA), jeffamine HK-511, or combinations thereof. The alkali catalyst may alternatively or additionally include potassium hydroxide (KOH). The amount of alkali catalyst added may be selected so that the pH of the aqueous liquid solution is generally in the range from about 7 to about 14 and preferably in the range from about 9 to about 12.

The liquid solution may optionally further include colloidal silica particles that are intended to act as nucleation sites for growth of the colloidal silica. In such embodiments, the final colloidal silica may be thought of as having a core-shell structure (or a multi-layer structure) in which the core includes the colloidal silica particles originally added to the liquid solution, and the shell (the outer layer) includes the silica that is grown over the core and includes an internal cationic compound (such as an aminosilane).

By another method, positively-charged colloidal silica abrasive particles having an internal cationic compound may be prepared by (i) providing a high pH silicate solution (e.g., a sodium silicate or potassium silicate solution), (ii) processing the silicate solution to protonate the silicate anions and form silicic acid (e.g., by adding an acid to the solution or passing the solution through an ion exchange column) which in turn causes precipitation and growth of colloidal silica particles in a reaction vessel, and (iii) adding the cationic compound to the reaction vessel such that it becomes incorporated into the growing colloidal silica particles. The silicate solution preferably has a pH in the range from about 11 to about 13. The silicate solution may be passed through an ion exchange column into the reaction vessel, which tends to lower the pH to a value in a range from about 2 to about 5. The cationic compound may be added to the reaction vessel in substantially any suitable amount and at substantially any suitable rate such that a sufficient amount of the cationic compound is incorporated into the colloidal silica particles (with the particles preferably—although not necessarily—including less than 10 weight percent of the cationic compound incorporated therein).

By yet another method, positively-charged colloidal silica abrasive particles may be prepared by treating (e.g., surface treating) conventional (e.g., uncharged) colloidal silica particles with cationic compound, and then growing additional silica over the treated colloidal silica (i.e., over the cationic compound). For example, a nitrogen-containing compound such as a quaternary amine compound or an aminosilane compound may be added to a colloidal silica-containing dispersion (e.g., as taught in U.S. Pat. Nos.7,994,057 and 8,252,687). After sufficient time to allow the nitrogen compound to become associated (e.g., chemically bonded or electrostatically associated) with the colloidal silica particles, a silica producing compound such as TMOS, TEOS, silicic acid, an alkali or ammonium silicate, or a silica tetrahalide may be added to the dispersion. The dispersion may be optionally heated (e.g., to 45 degrees C.) to accelerate further growth of the colloidal silica particles such that the cationic (e.g., nitrogen-containing) compound (the surface treatment agent) becomes incorporated into the particles at the particle interiors. Such positively-charged colloidal silica particles may be thought of as having at a core and multiple layers or coatings over the core: a first inner layer of the cationic compound on the core (i.e., the cationic compound-treated colloidal silica core), and an outer layer of silica deposited over the cationic compound, thereby placing the cationic compound at an interior location of the particle.

It will be understood that the above-described methods for preparing positively-charged colloidal silica particles having an internal cationic compound produce a dispersion in which the colloidal silica particles are suspended in a liquid carrier. In preparing the chemical mechanical polishing compositions herein, this dispersion may be diluted to a predetermined concentration of colloidal silica particles. Moreover, other chemical compounds may be added to the dispersion (before or after dilution) as desired.

Interior-charged colloidal silica particles may have any suitable degree of aggregation prior to or at the start of their use during CMP processing, but the level of aggregation and size of aggregated particles should not result in an unsuitable level of defects during CMP processing. Before the start of CMP processing, positively-charged colloidal silica particles may be substantially non-aggregated, including mostly primary particles, and the particles may be partially aggregated. By partially aggregated it may be that 50 percent or more of the colloidal silica abrasive particles include two or more aggregated primary particles (e.g., three, four, or five aggregated particles) or that 30 percent or more (or 45 percent or more) of the colloidal silica particles include three or more (e.g., four or five) aggregated primary particles. Such partially aggregated colloidal silica abrasives may be prepared, for example, using a multi-step process in which primary particles are first grown in solution, for example as described in U.S. Pat. No. 5,230,833. The pH of the solution may then be adjusted to an acidic value for a predetermined time period to promote aggregation, for example, as described in U.S. Pat. No. 8,529,787. An optional final step may allow for further growth of the aggregates (and any remaining primary particles).

Positively-charged colloidal silica abrasive particles may further have an aggregate distribution in which 20 percent or more of the colloidal silica abrasive particles include fewer than three primary particles (i.e., non-aggregated primary particles or aggregated particles having just two primary particles, also referred to as monomers and dimers) and 50 percent or more of the colloidal silica abrasive particles include three or more aggregated primary particles.

The polishing composition includes liquid carrier that facilitates application of the abrasive particles and chemical ingredients and additives of the polishing composition to a surface of a substrate to be processed, e.g., polished, planarized, etc. The liquid carrier may be any suitable carrier (e.g., solvent) such as a lower alcohol (e.g., methanol, ethanol, etc.), ether (e.g., dioxane, tetrahydrofuran, etc.), water, or a mixture thereof. Preferably, the liquid carrier comprises, consists essentially of, or consists of water, more preferably deionized water. A carrier that consists essentially of water can contain up to (not more than) 3, 2, 1, 0.5, 0.1, or 0.05 weight percent non-water solvent such as a lower alcohol (e.g., methanol, ethanol, etc.), ethers (e.g., dioxane, tetrahydrofuran, etc.).

The polishing composition is acidic, having a pH of less than about 7. The polishing composition typically has a pH of about 1 or more (e.g., about 2 or more, or about 3 or more). The polishing composition may have a pH of about 6 or less (e.g., about 5 or less, or about 4 or less).

The pH of the polishing composition may be achieved or maintained by any suitable means. The polishing composition may include substantially any suitable pH adjusting agents or buffering systems. For example, suitable pH adjusting agents may include nitric acid, sulfuric acid, phosphoric acid, phthalic acid, citric acid, adipic acid, oxalic acid, malonic acid, maleic acid, ammonium hydroxide, and the like, while suitable buffering agents may include phosphates, sulfates, acetates, malonates, oxalates, borates, ammonium salts, and the like.

The polishing composition includes cyclodextrin. Cyclodextrins are a family of well-known compounds made of multiple sugar molecules and formed into a ring structure, such compounds sometimes being referred to as cyclic oligosaccharides. Cyclodextrins are composed of α-D-glucopyranoside molecular units connected by a 1-4 linkage (see figure below) between the units. Forms of cyclodextrin that are useful in a polishing composition as described include α (alpha)-cyclodextrin, which is a 6-membered ring; β (beta)-cyclodextrin, which is a 7-membered ring, and γ (gamma)-cyclodextrin, which is an 8-membered ring:

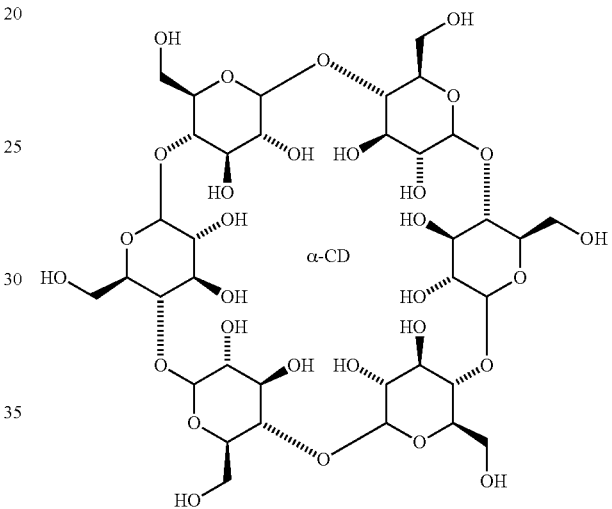

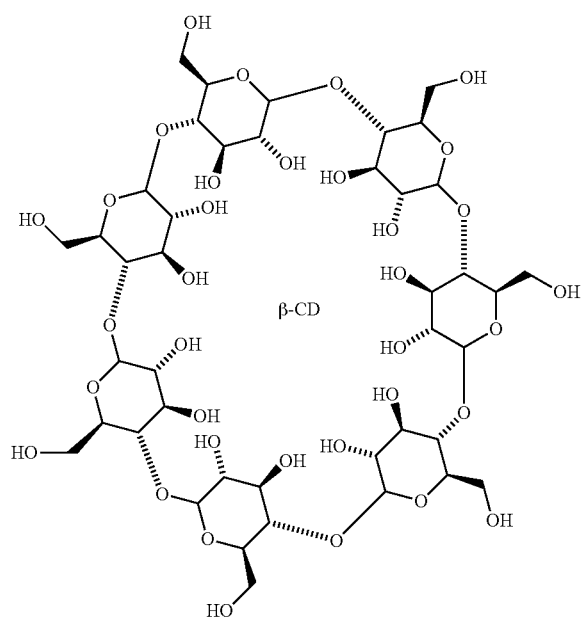

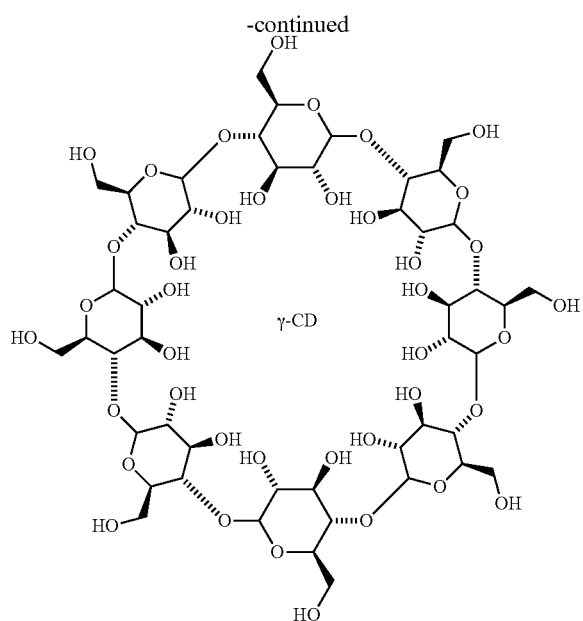

γ-CD

The cyclodextrin can be present in the polishing composition in an amount that will be effective to result in the presence of a desired amount of the cyclodextrin-cationic surfactant complex in the composition, while at the same time providing the polishing composition with useful or improved processing properties (e.g., with desired removal rates), and useful and desired topography and defectivity properties of a processed substrate. Particular amounts of cyclodextrin in a slurry may depend on factors such as the specific substrate being processed (e.g., polished) and other ingredients present in the slurry, such as the type and amount of abrasive particles, catalyst, oxidizing agent, inhibitor, etc. In certain useful embodiments, cyclodextrin can be present in the slurry in an amount in a range from about 0.01 to about 2 weight percent cyclodextrin based on the total weight of the composition, e.g., from about 0.02 to about 1.5 weight percent, meaning in a composition at the point of use in a CMP process, i.e., a "use composition." The concentration can be higher if the composition is in a concentrated form that is intended for storage, transport, and to be diluted prior to being used in a CMP process.

Cationic surfactant can be of any type that, in the environment of the slurry, will form a cyclodextrin-cationic surfactant complex (see below), and that will at the same time produce a CMP composition that is effective to process a tungsten-containing surface of a substrate. The cationic surfactant can preferably be selected to produce a slurry (also containing other slurry ingredients as described herein such as abrasive processing properties (e.g., removal rate) during processing, and topography and low level of defects in a processed substrate.

Included in considering ingredient selection for a CMP slurry for processing (e.g., polishing) a tungsten-containing substrate surface is that certain types of chemical materials such as certain nitrogen-containing compounds, including certain cationic surfactants, can function to inhibit the removal of tungsten, dielectric material such as oxide (e.g., TEOS), or both, during CMP processing. Accordingly, nitrogen-containing compounds such as certain types of cationic surfactants may be included in a slurry for polishing a tungsten-containing surface only if the cationic compound does not result in an unduly diminished removal rate for tungsten, oxide (e.g., TEOS), or both. According to the present invention, various types of nitrogen-containing cationic surfactants have been identified that, when included in a CMP slurry with cyclodextrin (in a manner that results in formation of the cyclodextrin-cationic surfactant complex), provide a CMP polishing slurry that exhibits desirable or advantageous performance properties such as improved topography and reduced defects relative to an otherwise identical slurry that does not contain the cationic surfactant, the cyclodextrin, and the complex, while still exhibiting useful removal rates for tungsten and oxide (e.g., TEOS).

Some non-limiting examples of cationic surfactants capable of forming a complex with cyclodextrin in the polishing composition with good performance properties include compounds having the structure of Formula I:

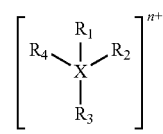

wherein:
n is at least 1,
X is $P^+$ or $N^+$,
$R_1$ is a straight or branched (preferably straight) alkyl group, optionally substituted, optionally containing unsaturation, that contains at least 7 carbon atoms, preferably 8 to 18 carbon atoms, e.g., from 12 to 18 carbon atoms;
$R_2$, $R_3$, and $R_4$ can independent be selected from:
  hydrogen,
  a saturated or unsaturated cyclic group that may be substituted or unsubstituted and may optionally include a heteroatom, a charged group, or both,
  a linear or branched alkyl group that may optionally include one or more of unsaturation, a heteroatom, or charged group, and
  a saturated or unsaturated ring structure formed from two or three of $R_2$, $R_3$, and $R_4$, the ring optionally being substituted.

In Formula I, the X atom will be cationically charged in the slurry during use in a CMP process due to the slurry pH, e.g., the X atom will be $N^+$ or $P^+$ when present in the slurry during use. The cationic surfactant may be introduced into the slurry as a salt with any useful counterion such as $NO^{3-}$, $OH^-$, $Br^-$, $Cl^-$, etc. The term "alkyl" refers to a branched or straight un-substituted (unless otherwise specified) hydrocarbon group including groups that are saturated or that include unsaturation. A "substituted" group (e.g., substituted alkyl, cycloalkyl, aryl) refers to a group in which a carbon-bonded hydrogen is replaced by a non-hydrogen atom such as a halide, or by a functional group such as an amine, hydroxide, etc.

In certain embodiments, $R_1$ is the largest of the $R_1$ through $R_4$ groups and is an alkyl or substituted alkyl (optionally with unsaturation) group that is effective to associate with the cyclodextrin molecule to form a cyclodextrin-cationic surfactant complex while in the polishing composition. For example $R_1$ can contain from 7 to 30 carbon atoms, e.g., from 8 to 18 carbon atoms or from 10 to 18 carbon atoms; may optionally include one or more heteroatom along the backbone or as part of a substituted group that replaces a carbon-bonded hydrogen atom; may be saturated or may contain unsaturation. To facilitate $R_1$ associating with the cyclodextrin molecule, $R_1$ may preferably be an uncharged linear alkyl group that is un-substituted and that is saturated or mostly saturated, e.g., a linear alkyl of from 7 to 20, e.g., 8 to 18, e.g., 10 to 18 carbon atoms.

In certain preferred embodiments, not all of $R_2$, $R_3$, and $R_4$ are hydrogen.

In certain embodiments $R_2$ is not hydrogen and is an alkyl group that contains fewer carbon atoms than $R_1$, e.g., not more than 12, 10, or 8 carbon atoms, e.g., from 1 to 10 carbon atoms, or from 1 to 8, 1 to 6, or from 1 to 4 carbon atoms. $R_2$ may optionally include one or more heteroatoms along the backbone or as part of a pendant functional group along the length of the backbone and may be linear, branched, saturated, or may contain unsaturation. Also optionally, $R_2$ may include a cationic charge, e.g., due to the presence of a charged heteroatom such as $N^+$ or $P^+$, when present in the slurry during use.

$R_3$ and $R_4$ may independently be hydrogen, or may be of a structure as specified directly above for $R_2$. In certain embodiments, $R_3$, $R_4$, or both, may be smaller than $R_2$, i.e., contain fewer carbon atoms compared to $R_2$, such as H or a lower saturated alkyl such as a linear or branched alkyl having from 1 to 6 carbon atoms, such as from 1 to 3 or 1 to 4 carbon atoms.

Examples of useful or preferred cationically charged surfactants according to Formula I include cationic compounds wherein $R_1$ is a saturated alkyl group, and $R_2$, $R_3$, and $R_4$, are independently hydrogen or a lower alkyl. Examples include cetyl trimethylammonium bromide (CTAB or cetrimoniuim bromide), myristyltrialkylammonium and salts thereof, and lauryltrialkylammonium and salts thereof.

In certain other embodiments, $R_1$ or $R_2$ can be a group that includes one or more additional cationic charges, making the cationic surfactant dicationic, tricationic, etc. Examples of such compounds are described in U.S. Pat. No. 7,695,637, the entirety of which is incorporated herein. $R_2$ can include a divalent linking group (—Z—) that extends to a second cationic atom such as a cationic nitrogen, i.e., R2═—Z—$N^+$-(—R5)(—R6)(—R7):

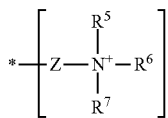

The cationic compound will have the structure of Formula II:

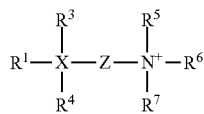

In Formula II, Z is a divalent linking group that may be saturated alkyl, unsaturated alkyl, or may alternately or additionally include a heteroatom (N, O) as part of a backbone or a substituent, or another type of substitution (halogen, hydroxide). Examples of Z include a straight-chain divalent (alkylene) group, e.g., methylene, ethylene, propylene, butylene, etc. In these embodiments, $R_3$ and $R_4$ of Formula I, and $R_5$, $R_6$, and $R_7$ can each preferably and independently be an alkyl group having from 1 to 5 carbon atoms.

One example of a di-cationically charged surfactant is N,N,N',N',N',-pentamethy-N-tallow-1,3-propane-diammonium dichloride.

A dicationic surfactant compound can exist in a di-cationically charged state when in the slurry, and may be introduced to the slurry or may exist outside of the slurry in the form of a salt having any useful counterion or counterions. The two counterions for each of the two cationic atoms of the compound may the same or different.

Another group of non-limiting examples of cationic surfactants as described herein that are capable of forming a complex with cyclodextrin and that can be used in a CMP slurry with good performance properties includes compounds wherein the X atom is part of an unsaturated heterocyclic ring structure, i.e., $R_2$, $R_3$, and $R_4$, combine to form an unsaturated ring structure. At least one of the substituents of the ring (such as but not necessarily the $R^1$ group attached to the X atom) can be a straight or branched (preferably straight) alkyl group, optionally substituted, optionally containing unsaturation, that contains at least 7 carbon atoms, preferably 8 to 18 carbon atoms, e.g., from 12 to 18 carbon atoms, and is capable of forming a complex as described herein, with a cyclodextrin molecule. Example compounds include six-membered heterocyclic substituted or un-substituted rings, including those having a structure as defined by Formula III:

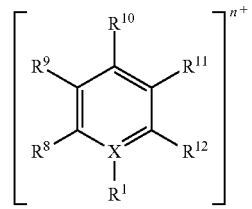

wherein:
n is at least 1,
X is $P^+$ or $N'$,
$R_1$ is a straight or branched (preferably straight) alkyl group, optionally containing unsaturation, that contains at least 7 carbon atoms, and
$R_8$, $R_9$, $R_{10}$, $R_{11}$, and $R_{12}$ can independently be selected from:
hydrogen,
a saturated or unsaturated cyclic group that may be substituted or unsubstituted and may optionally include a heteroatom, a charged group, or both, and
a linear or branched alkyl group that may optionally include one or more of unsaturation, a heteroatom, or charged group.

According to certain preferred embodiments, each of $R_8$, $R_9$, $R_{11}$, and $R_{12}$ is hydrogen and $R_{10}$ is an unsaturated cyclic group that may be substituted or unsubstituted and may optionally include a heteroatom (e.g., nitrogen), a charged group (e.g., a charged nitrogen heteroatom), or both.

Certain compounds of Formula III have been identified as exhibiting preferred performance in a slurry. Examples include N,N'-dioctyl 4,4'-bipyridinium (DOBPB), C16-N-alkyl pyridinium (N-hexadecyl pyridinium), 1-Heptyl-4-(4-pyridyl)pyridinium bromide (HPPB), and the like.

Without being bound by theory, a cationic surfactant that exhibits a relatively higher hydrophobicity, a relative high charge, or both, can be preferred for use as the cationic surfactant, as compared to cationic surfactants that exhibit a relatively lower hydrophobicity, lower charge, or both. Certain compounds that exhibit a relatively low hydrophobicity, relatively low charge, or both, include tetrabutylammonium hydroxide (TBAH), tetramethylammonium hydroxide (TMAH), N-hexyl pyridinium (C6py), hexamethonium bromide (HMB). These compounds have been found to be less preferred or less useful as compared to compounds having higher hydrophobicity, higher charge, or both, including, as mentioned, the following: cetyl trimethylammonium bromide (CTAB or cetrimoniuim bromide), N,N,N',N',N',-pentamethy-N-tallow-1,3-propane-diammonium dichloride, N,N'-dioctyl 4,4'-bipyridinium (DOBPB), C16 N-alkyl pyridinium (N-hexadecyl pyridinium), and N-heptyl-4,4' bipyridinium (HPPB).

Another group of non-limiting examples of cationic surfactants as described herein that are capable of forming a complex with cyclodextrin and that can be used in a polisihng composition with good performance properties includes compounds wherein the X atom is part of a saturated heterocyclic ring structure, i.e., two of $R_2$, $R_3$, and $R_4$, combine to form a saturated ring structure. At least one of the substituents of the saturated ring (such as but not necessarily the $R^1$ group attached to the X atom), can be a straight or branched (preferably straight) alkyl group, optionally substituted, optionally containing unsaturation, that contains at least 7 carbon atoms, preferably 8 to 18 carbon atoms, e.g., from 12 to 18 carbon atoms, and that is capable of forming a complex as described herein, with a cyclodextrin molecule. Example compounds include six-membered heterocyclic substituted or un-substituted saturated rings including those having a structure as defined by Formula IV:

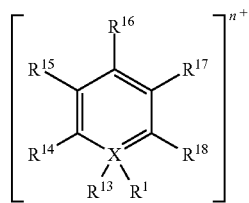

wherein:
n is at least 1,
X is $P^+$ or $N^+$,
$R_1$ is a straight or branched (preferably straight) alkyl group, optionally containing unsaturation, that contains at least 7 carbon atoms, and
$R_{13}$, $R_{14}$, $R_{15}$, $R_{16}$, $R_{17}$, and $R_{18}$ can be independently selected from:
hydrogen,
a saturated or unsaturated cyclic group that may be substituted or unsubstituted and may optionally include a heteroatom, a charged group, or both, and
a linear or branched alkyl group that may optionally include one or more of unsaturation, a heteroatom, or charged group.

The cationic surfactant can be included in the polishing composition in an amount effective to provide desired processing performance properties of the slurry when processing a tungsten-containing substrate surface, such properties including one or more of a desired tungsten removal rate; desired oxide (e.g., TEOS) removal rate; useful or low particle size growth; desired topography including reduced erosion, reduced dishing, or both; and useful or low defectivity as measured by scratching or residue. With the cyclodextrin also present in the polishing composition, the amount of cationic surfactant can provide one or more of these improvements without causing undue negative impact in terms of reduced removal rate or particle instability. Particular amounts of cationic surfactant may depend on factors such as the specific substrate being processed (e.g., polished) and other ingredients in the slurry such as the type and amount of abrasive particles, catalyst, inhibitor, etc.

The amount of cationic surfactant included the polishing composition (along with the cyclodextrin) may be an amount that provides desired performance improvement without producing an undue detrimental effect. Preferred polishing compositions that contain cationic surfactant and cyclodextrin will exhibit useful or improved performance properties due to the presence of the cationic surfactant, such as improved topography of a processed substrate in the form of reduced erosion, dishing, or both. When cyclodextrin is also present, the cationic surfactant does not produce an undue reduction in other desired properties or performance of the slurry; for example, removal rates (of tungsten and dielectric material) are not unduly reduced, and particle stability of the slurry is acceptable (during storage or during use as measured by particle size growth).

In some embodiments, the cyclodextrin allows the polishing composition to include cationic surfactant in an amount (concentration) that is relatively higher compared to an amount of the same cationic surfactant that can be contained in an otherwise identical composition without the cyclodextrin. The amount of cationic surfactant can advantageously be increased due to the presence of the cyclodextrin, preferably without detrimentally affecting other physical or performance properties of the slurry. An increased amount of cationic surfactant can be desired in a slurry to the extent that the increased amount produces an increased performance improvement, such as by producing improved topography such as reduced erosion or dishing, without producing another detrimental effect that would outweigh the improvement.

In certain useful embodiments the cationic surfactant, at the point of use during CMP processing, can be present in the slurry in an amount in a range from about 0.001 to about 0.5 weight percent cationic surfactant based on the total weight of the composition, e.g., from about 0.01 to about 0.5 weight percent cationic surfactant based on the total weight of the composition.

Relative to the cyclodextrin, an amount of cationic surfactant can be an amount that allows for a desired amount of the complex to form in the polishing composition, e.g., in an amount that may be approximately a stoichiometric amount of the cyclodextrin and the cationic surfactant, i.e., approximately equal molar amounts. For example, a molar ratio of the cationic surfactant to the cyclodextrin may be in a range from 0.5 to 1.5 moles cationic surfactant per mole cyclodextrin, e.g., from 0.75 to 1.25 moles cationic surfactant per mole cyclodextrin, or from about 0.9 to 1.1 moles cationic surfactant per mole cyclodextrin.

In a polishing composition as described, the cationic surfactant, having at least one R-substituent of carbon length seven or more, can form a complex with the alpha-, beta-, or gamma-cyclodextrin. Without being bound by theory, the at least one group (such as but not necessarily the $R_1$ group described herein) having at least seven carbon atoms, preferably also being an uncharged, un-substituted, linear alkyl group with no unsaturation or only slight unsaturation, can become associated with a single cyclodextrin molecule by the alkyl group of carbon length seven or more becoming located within the interior of the cyclodextrin molecule ring. That combination of the cationic surfactant molecule in association with the cyclodextrin molecule is referred to herein as the "cyclodextrin-cationic surfactant complex" or simply as the "complex." The complex will include the portion of the cationic surfactant that contains the cation extending from the cyclodextrin ring structure while the alkyl group of carbon length seven or more is located at the interior of the cyclodextrin molecule ring.

The amount of the complex that will be present in the polishing composition will depend on the amount of cationic surfactant and the amount of cyclodextrin in the polishing composition, the amounts and types of other ingredients, and the chemical identity of the cationic surfactant and its propensity to associate with and form the complex with the cyclodextrin at the conditions of the polishing composition, i.e., the equilibrium constant between the two separate cationic surfactant and cyclodextrin molecules, and the complex. Generally, the complex can be present in an amount effective to provide desired processing performance properties of the polishing composition when polishing a tungsten-containing substrate surface, such properties including one or more of a desired tungsten removal rate, desired oxide (e.g., TEOS) removal rate, useful or low particle size growth, and useful or low defectivity as measured by scratching or residue. Particular amounts of the complex may depend on factors such as the specific substrate being processed (e.g., polished) and other ingredients in the polishing composition. In certain useful embodiments the cationic surfactant can be present in the polishing composition in an amount in a range from about 0.001 to about 0.5 weight percent cationic surfactant based on the total weight of the composition, e.g., from about 0.01 to about 0.5 weight percent cationic surfactant based on the total weight of the composition.

Embodiments of the polishing composition may optionally and preferably include catalyst that will be effective in processing (e.g., polishing) a tungsten-containing surface of a substrate. The catalyst may contain a metal, which can be any metal, such as iron. Iron-containing catalysts effective to increase the removal rate of tungsten during a tungsten CMP operation are well known. Examples of soluble iron-containing catalysts are described in U.S. Pat. Nos. 5,958,288 and 5,980,775, the entireties of these documents being incorporated herein by reference. Such an iron-containing catalyst may be soluble in the liquid carrier and may include, for example, ferric (iron III) or ferrous (iron II) compounds such as iron nitrate, iron sulfate, iron halides (including fluorides, chlorides, bromides, and iodides, as well as perchlorates, perbromates and periodates), and organic iron compounds such as iron acetates, acetylacetonates, citrates, gluconates, malonates, oxalates, phthalates, and succinates, and mixtures thereof.

The polishing composition may also include an iron-containing catalyst associated with (e.g., coated or bonded to) a surface of colloidal silica particles such as is disclosed in U.S. Pat. No. 7,029,508 and 7,077,880. In embodiments described therein, abrasive particles may contain a boron-containing stabilizer along with iron-containing catalyst. In such embodiments the stabilizer and catalyst may occupy substantially any percentage of the available surface sites on the colloidal silica particles, for example, greater than 1%, greater than 50%, or greater than 80% of the available surface sites.

The amount of iron-containing catalyst in the polishing composition may be varied depending upon the presence and type of oxidizing agent (if any, see below) and the chemical form of the catalyst. When hydrogen peroxide (or an analog) is used as an oxidizing agent and iron-containing catalyst is used (such as ferric nitrate), the catalyst may be present in the composition in an amount sufficient to provide a range from about 0.1 to about 3000 ppm Fe based on the total weight of the composition. The polishing composition preferably includes about 1 ppm Fe or more (e.g., about 5 ppm or more, about 10 ppm or more, or about 20 ppm or more). The polishing composition preferably includes about 500 ppm Fe or less (e.g., about 200 ppm or less, about 100 ppm or less, or about 50 ppm or less). The polishing composition may thus include a range from about 1 to about 500 ppm Fe (e.g., from about 3 to about 200 ppm, from about 5 to about 100 ppm, or from about 10 to about 50 ppm).

A polishing composition that includes iron-containing catalyst may also include a stabilizer. Without a stabilizer, the iron-containing catalyst and the oxidizing agent may react in a manner that degrades the oxidizing agent rapidly over time. The addition of a stabilizer tends to reduce the effectiveness of the iron-containing catalyst such that the choice of the type and amount of stabilizer added to the polishing composition may have a significant impact on CMP performance. The addition of a stabilizer may lead to the formation of a stabilizer-catalyst complex that inhibits the catalyst from reacting with the oxidizing agent (e.g., hydrogen peroxide) while at the same time allowing the catalyst to remain sufficiently active to promote rapid tungsten polishing rates.

Exemplary stabilizers include phosphoric acid, organic acids, phosphonate compounds, nitriles, and other ligands which bind to the metal of the catalyst compound and reduce its reactivity toward an oxidizing agent (e.g., hydrogen peroxide) decomposition. The acid stabilizers may be used in their conjugate forms, e.g., the carboxylate can be used instead of the carboxylic acid. For purposes of this application the term "acid" as it is used to describe useful stabilizers also means the conjugate base of the acid stabilizer. For example the term "adipic acid" means adipic acid and its conjugate base. Stabilizers can be used alone or in combination and significantly decrease the rate at which oxidizing agents such as hydrogen peroxide decomposes.

Preferred stabilizers include phosphoric acid, acetic acid, phthalic acid, citric acid, adipic acid, oxalic acid, malonic acid, aspartic acid, succinic acid, glutaric acid, pimelic acid, suberic acid, azelaic acid, sebacic acid, maleic acid, glutaconic acid, muconic acid, ethylenediaminetetraacetic acid (EDTA), propylenediaminetetraacetic acid (PDTA), and mixtures thereof. The preferred stabilizers may be included in a composition as described in an amount ranging from about 1 equivalent per iron-containing catalyst to about 3.0 weight percent or more. As used herein, the term "equivalent per iron-containing catalyst" means one molecule of stabilizer per iron ion in the composition. For example, 2 equivalents of stabilizer per iron-containing catalyst means two molecules of stabilizer for each catalyst ion.

The polishing composition may optionally and preferably include oxidizing agent. Oxidizing agent may be added to the polishing composition during the slurry manufacturing process or just prior to a CMP operation (e.g., in a tank located at a semiconductor fabrication facility). Exemplary oxidizing agents include inorganic and organic per-compounds. A per-compound as defined by Hawley's Condensed Chemical Dictionary is a compound containing at least one peroxy group (—O—O—) or a compound containing an element in its highest oxidation state. Examples of compounds containing at least one peroxy group include but are not limited to hydrogen peroxide and its adducts such as urea hydrogen peroxide and percarbonates, organic peroxides such as benzoyl peroxide, peracetic acid, and di-t-butyl peroxide, monopersulfates ($SO_5^=$), dipersulfates ($S_2O_8^=$), and sodium peroxide. Examples of compounds that contain an element in its highest oxidation state include but are not limited to periodic acid, periodate salts, perbromic acid, perbromate salts, perchloric acid, perchlorate salts, perboric acid, and perborate salts and permanganates. An often-preferred oxidizing agent is hydrogen peroxide.

The polishing composition may also contain an inhibitor compound, e.g., a nitrogen-containing inhibitor compound that is effective to inhibit the conversion of solid tungsten into soluble tungsten compound, while at the same time allowing for an effective removal rate of solid tungsten during CMP processing. The inhibitor may be a nitrogen-containing inhibitor compound that is different from the compounds of Formula I. Like cationic surfactant of Formula I, a nitrogen-containing inhibitor can be selected to produce a slurry that exhibits a desired removal rate of tungsten, oxide (e.g., TEOS), or both, during polishing. The nitrogen-containing inhibitor can also be selected so that the slurry will not exhibit undue particle size growth during CMP processing, as a consequence not producing an increase in defects such as residue or scratching caused by particle growth during processing.

Classes of compounds that are useful inhibitors of tungsten etching include compounds having nitrogen-containing functional groups such as nitrogen-containing heterocycles, alkyl ammonium ions, amino alkyls, and amino acids. Useful amino alkyl corrosion inhibitors include, for example, hexylamine, tetramethyl-p-phenylene diamine, octylamine, diethylene triamine, dibutyl benzylamine, aminopropylsilanol, aminopropylsiloxane, dodecylamine, mixtures thereof, and synthetic and naturally occurring amino acids including, for example, lysine, tyrosine, glutamine, glutamic acid, cystine, glycine (aminoacetic acid).

In certain embodiments of the polishing composition the amine compound may include a polycationic amine. Diquaternary amine compounds may include, for example, N,N'-methylenebis(dimethyltetradeclammonium bromide), 1,1,4,4-tetrabutylpiperazinediium dibromide, dimethyl-1,5-diazoniabicyclo(3.2.2)nonane dibromide, didodecyl-tetramethyl-1,4-butanediaminium diiodide, or N(1),N(1),N(6),N(6)-didodecyl-N(1),N(1),N(6),N(6)-tetramethyl-1,6-hexanediaminium diiodide.

The polishing composition may include substantially any suitable concentration of inhibitor compound. In general the concentration is desirably high enough to provide adequate etch inhibition but low enough so that the compound is soluble and so as not to reduce tungsten polishing rates below acceptable levels. By soluble it is meant that the compound is fully dissolved in the liquid carrier or that it forms micelles in the liquid carrier or is carried in micelles. It may be necessary to vary the concentration of the inhibitor compound depending upon various factors, for example, including the solubility thereof, the number of amine groups therein, the length of an alkyl group, the relationship between etch rate inhibition and polishing rate inhibition, the oxidizing agent used, the concentration of the oxidizing agent, and so on. In certain desirable embodiments, the concentration of tungsten inhibitor compound in a polishing composition may be in a range from about 0.1 µM to about 10 mM (i.e., from about $10^{-7}$ to about $10^{-2}$ molar). For example, in embodiments using an amine-based polymer having a high molecular weight, the concentration may be on the lower end of the range (e.g., from about $10^{-7}$ to about $10^{-4}$ molar). In other embodiments using a comparatively simple amine compound (having fewer amine groups and a lower molecular weight), the concentration may be on the higher end of the range (e.g., from about $10^{-5}$ to about $10^{-2}$ molar).

In certain chemical mechanical polishing applications (e.g., shallow trench applications), tungsten and silicon oxide may be polished in combination with a silicon nitrogen material such as silicon nitride (SiN). In particular applications it may be desirable to achieve a high removal rate for both the silicon oxide and the silicon nitrogen material (e.g., such that a TEOS:SiN polishing rate selectivity is less than about 15:1 and such that the TEOS and SiN polishing rates are greater than the tungsten polishing rate). The chemical mechanical polishing composition may therefore optionally further include a silicon nitrogen polishing accelerator. The silicon nitrogen polishing accelerator may include, for example, substantially any suitable poly acid such as a polycarboxylic acid, a poly phosphonic acid, or a mixture of these. Example polycarboxylic acids may include, for example, oxalic acid, malonic acid, succinic acid, glutaric acid, adipic acid, tartaric acid, sulfosuccinic acid, and phthalic acid. It will be understood that such polycarboxylic acids may generally be used in their conjugate form, e.g., the carboxylate can be used instead of the carboxylic acid. For the purposes of this application the term "acid" as it is used to describe useful silicon nitrogen accelerators also means the conjugate base (or bases) of the acid.

Suitable poly phosphonic acids may include for example, methylene phosphonic acid compounds and diphosphonic acid compounds such as 1-hydroxyethylidene -1,1,-diphosphonic acid, amino tri(methylene phosphonic acid), diethylenetriamine penta(methylene phosphonic acid), and bis(hexamethylene triamine penta(methylenephosphonic acid)). It will be understood that such poly phosphonic acids may generally be used in their conjugate form, e.g., the phosphonate can be used instead of the phosphonic acid (as described above with respect to the carboxylic acids). Suitable examples of the above-described poly phosphonic acid compounds are sold under the Dequest® trade name (Italmatch Chemicals, Genova, Italy).

A polishing composition may optionally further include a uniformity additive for improving the within-wafer uniformity of the polishing rate (e.g., a wafer edge to center polishing rate ratio or difference), such as a polyethylene glycol.

The polishing composition may optionally further include a biocide. The biocide may include any suitable biocide, for example an isothiazolinone biocide. The amount of biocide in the polishing composition may be in a range from about 1 ppm to about 50 ppm, and preferably from about 1 ppm to about 20 ppm.

Certain embodiments of the described polishing compositions have been observed to achieve a higher silicon dioxide (TEOS) polishing rate when the electrical conductivity of the polishing composition is low. Such embodiments may be advantageously utilized for tungsten buffing applications. Example polishing compositions may therefore advantageously have an electrical conductivity of less than 2000 µS/cm (e.g., less than 1500 µS/cm, less than 1000 µS/cm, less than 800 µS/cm, less than 500 µS/cm, or less than 400 µS/cm, or less than 300 µS/cm).

Certain embodiments of the polishing compositions specifically designed for processing a tungsten-containing substrate surface can also exclude or minimize ingredients that are present in CMP slurries designed for processing other types of substrates, such other types of ingredients being present at not more than a low amount or an amount that is insignificant, e.g., an amount that is sufficiently low to prevent a noticeable detrimental effect on performance of the slurry in a CMP process such as a tungsten-polishing CMP process.

For example, certain embodiments of the described polishing compositions can either exclude entirely, or include not more than a very low level of surfactant that is different from the cationic surfactant defined herein. These embodiments can include not more than a low level or insignificant level of anionic surfactant or nonionic surfactant, e.g., polyvinyl alcohol surfactant, polyethylene glycol surfactant, polyacrylate surfactant, polyoxyethylene surfactant. For example these embodiments can include not more than 0.1, 0.05, or 0.01 weight percent of any of these non-cationic surfactants separately or in combination based on total weight of the composition. Examples of certain surfactants different from the cationic surfactant described herein, which can optionally be excluded from the a slurry as presently described or used at a low or very low level, are described in U.S. Pat. No. 6,979,252, the disclosure of which is incorporated herein by reference.

As another example, certain embodiments may also include not more than a low level or insignificant level of electrolytes such as $KNO_3$. Such embodiments can include not more than 0.1, 0.05, 0.01, or 0.001 weight percent $KNO_3$.

As another example, certain polishing composition embodiments may also include not more than a low level or insignificant level of cationic compounds that are not capable of forming complex with cyclodextrin as described, or that are otherwise not useful in a polishing composition as described, for example because: a cationic compound may produce instability of abrasive particles (e.g., instability of charged colloidal silica particles), may result in particle size growth during CMP processing, may result in an excessively low removal rate of tungsten or oxide (e.g., TEOS), or may otherwise result in unacceptable performance of the composition during CMP processing. Examples of such cationic compounds include tetrabutylammonium hydroxide, tetramethylammonium hydroxide, N-dodecyl pyridinium, N-hexyl pyridinium, and hexamethonium bromide. Thus, according to certain embodiments, preferred polishing compositions can include not more than 0.1, 0.05, 0.01, or 0.001 weight percent of any one or more of these cationic compounds.

As another example, certain polishing composition embodiments can either exclude entirely, or include not more than a low or very low level of abrasive particles that are different from preferred colloidal silica particles as described herein. Stated differently, the abrasive particles of these specific embodiments may include colloidal silica abrasive particles useful in combination with the described cationic surfactant and cyclodextrin, and can either entirely exclude or can contain not more than a small or insubstantial amount of any other type of abrasive particles; i.e., the abrasive particles of the slurry can consist of or consist essentially colloidal silica abrasive particles, e.g., charged colloidal silica particles as described. As used herein, abrasive particles that "consist essentially of" colloidal silica particles means that the abrasive particles do not contain more than a low amount or an insubstantial amount of any other type of abrasive particles, e.g., not more than 3, 2, or 1 percent, e.g., not more than 0.5, 0.1, 0.05, or 0.01 weight percent of another type of abrasive particle based on the total weight of abrasive particles in the polishing composition.

The polishing composition may be prepared using any suitable technique, many of which are known to those skilled in the semiconductor materials arts. The polishing composition may be prepared in a batch or continuous process. Generally, the polishing composition may be prepared by combining the components thereof in any order. The term "component" as used herein refers to a discrete ingredient of the composition, e.g., the colloidal silica or a dispersion thereof, cationic surfactant, optional catalyst (e.g., iron-containing catalyst), etc.).

The positively-charged colloidal silica abrasive particles may be prepared by steps that include growing the particles in an aqueous liquid carrier, and incorporating a chemical compound at the interior or at the surface of the particles (still in dispersion) to provide the particles with a charge, as described herein. The resulting dispersion may then be diluted and the pH adjusted to a predetermined value, for example, by adding acid. Other components such as the cationic surfactant, optional catalyst, optional stabilizer, and optional inhibitor, may then be added and mixed by any method that is useful to uniformly incorporate those added components into the polishing composition. The oxidizing agent may be added at any time during the preparation of the polishing composition. For example, the polishing composition may be prepared prior to use, with one or more components, such as the oxidizing agent, being added just prior to use of the polishing composition in a CMP operation (e.g., within about 1 minute, or within about 10 minutes, or within about 1 hour, or within about 1 day, or within about 1 week of the CMP operation). The polishing composition also may also be prepared by mixing the components at the surface of the substrate (e.g., on the polishing pad) during the CMP operation.

The polishing composition may be supplied as a one-package system that contains the charged colloidal silica particles, cationic surfactant, optional catalyst (e.g., iron-containing catalyst), optional inhibitor, an optional stabilizer, an optional biocide, and water. In certain embodiments the oxidizing agent is supplied separately from the other components of the polishing composition and is combined, e.g., by the end-user, with the other components of the polishing composition shortly before use (e.g., 1 week or less prior to use, 1 day or less prior to use, 1 hour or less prior to use, 10 minutes or less prior to use, or 1 minute or less prior to use).

The polishing composition may advantageously be provided as a concentrate that is intended to be diluted with an appropriate amount of water, to form a "use composition" before use in CMP processing. In such an embodiment, the polishing composition concentrate may include the charged colloidal silica abrasive particles and other optional components in amounts such that, upon dilution of the concentrate with an appropriate amount of water each component of the polishing composition will be present in the polishing composition in an amount within the appropriate range recited above for each component. For example, the colloidal silica abrasive particles may be present in the polishing composition in an amount that is about 2 times (e.g., about 3 times, about 4 times, about 5 times, or even about 10 times) greater than the concentration recited above for each component so that when the concentrate is diluted with an equal volume of water (alternately 2, 3, 4, or even 9 equal volumes of water, respectively), each component will be present in the polishing composition in an amount within the ranges set forth above.

Furthermore, as will be understood, the concentrate may contain an appropriate fraction of the water present in the final polishing composition in order to ensure that other components are at least partially or fully dissolved in the concentrate.

In one embodiment, a suitable concentrate includes at least 5 or 10 weight percent colloidal silica abrasive particles dispersed in a water based liquid carrier (e.g., a colloidal silica including a nitrogen containing compound such as an aminosilane compound or a phosphorus containing compounds such as a phosphonium silane compound incorporated internal to an outer surface of the particles), along with the cationic surfactant, cyclodextrin, and other optional ingredients. The colloidal silica particles may have a permanent positive charge of at least 6, 8, or 10 mV. The concentrated composition may further include an iron-containing catalyst and other optional components described above. Moreover, the pH of the composition may be in a range from about 1 to about 6, e.g., from 2 to about 5.

Although the polishing composition of the invention may be used to polish any substrate, the polishing composition is particularly useful in polishing a substrate surface that includes at least one metal including tungsten and at least one dielectric material. The tungsten layer may be deposited over one or more barrier layers, for example titanium or titanium nitride (TiN). The dielectric layer may be a metal oxide such as a silicon oxide layer derived from tetraethylorthosilicate (TEOS), porous metal oxide, porous or non-porous carbon-doped silicon oxide, fluorine-doped silicon oxide, glass, organic polymer, fluorinated organic polymer, or any other suitable high or low-k insulating layer.

A polishing composition as described may be used in a polishing method that uses a chemical-mechanical polishing (CMP) apparatus. Typically, the apparatus includes a platen, which, when in use, is in motion and has a velocity that results from orbital, linear, or circular motion. A polishing pad contacts the platen and moves with the platen when in motion. A carrier holds a substrate to be polished by contacting and moving a surface of the substrate relative to a surface of the polishing pad. Processing of the substrate surface takes place by the substrate being placed in contact with the polishing pad and a polishing composition, while the polishing pad is moved relative to the substrate surface to abrade at least a portion of the substrate (such as tungsten, titanium, titanium nitride, and/or a dielectric material as described herein).

A useful process may be a tungsten-polishing CMP process wherein a substrate (wafer) to be polished, having a tungsten-containing surface, is mounted on a carrier (polishing head), which is in turn mounted on a carrier assembly and positioned in contact with a polishing pad in a CMP apparatus (polishing tool). The carrier assembly provides a controllable pressure to the substrate, pressing the substrate against the polishing pad. The substrate and pad are moved relative to one another by an external driving force. The relative motion of the substrate and pad abrades and removes material from the surface of the substrate, thereby polishing the substrate. Polishing and removal of material may be based on the combined effects of the chemical activity of the polishing composition (e.g., by catalyst, oxidizing agent, etc., present in the polishing slurry), and the mechanical activity of the abrasive particles suspended in the polishing composition.

A substrate can be planarized or polished with the chemical-mechanical polishing composition with any suitable polishing pad (e.g., polishing surface). Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, coformed products thereof, and mixtures thereof One example of a substrate that has tungsten (or another metal) features disposed between dielectric features, is a semiconductor substrate that includes tungsten "plug" and "interconnect" structures provided between features of dielectric material. To produce such structures, a substrate is provided to include a structured dielectric surface. The structured dielectric surface is non-planar, meaning that it includes a surface that is substantially flat or planar except for being interrupted and made discontinuous by the presence of the spaces such as holes, channels, trenches, or the like. Tungsten is applied over the structured dielectric surface to fill the spaces with the tungsten and to produce a continuous layer of excess tungsten over the structured dielectric material. A next step is to remove the excess tungsten and also expose the underlying dielectric layer, producing a planar surface of the tungsten disposed between features of the structured dielectric material.

By some methods, tungsten is removed in a single step that uncovers the dielectric surface. By other methods, a "two-step" process can be used. In a first step a large portion of the excess tungsten is removed, but the dielectric layer is not exposed. This step is commonly referred to as a "bulk" removal step, during which a high tungsten removal rate is desired. A subsequent (second) step can be used to remove a final portion of the remaining tungsten and expose the underlying dielectric material with tungsten filling the spaces between dielectric features. This step is sometimes referred to as a "buff" polishing step, wherein a high tungsten removal rate may be important, but wherein other performance requirements are important too, e.g., topography in the form of a lack of erosion or dishing, good removal rates of the tungsten and dielectric material, and low levels of defects such as scratching.

In one embodiment, a method of chemical mechanical polishing a substrate including tungsten and a silicon oxygen material (such as TEOS) makes use of one of the disclosed polishing compositions, for example, having an acidic pH and less than about 4 weight percent of the colloidal silica abrasive particles. In such an embodiment, an average removal rate of TEOS may be greater than 100 Å/min at 2.0 psi downforce (or even greater than 500 Å/min or even greater than 1000 Å/min or more). Moreover, the removal rate of TEOS may be greater than the removal rate of tungsten (i.e., the TEOS:W selectivity may be greater than 1). In an embodiment in which the substrate further includes a silicon nitrogen material the removal rate of the silicon nitrogen material may also be greater than the removal rate of tungsten.

In another embodiment a method of chemical mechanical polishing a substrate including tungsten and a silicon oxygen material (such as TEOS) makes use of one of the disclosed polishing compositions, for example, having a pH less than 4 and less than about 2 weight percent of the colloidal silica abrasive particles. In such an embodiment, an average removal rate of tungsten may be greater than 200 Å/min at a downforce of 2.5 psi (or even greater than 500 Å/min. Such polishing rates may be achieved on wafers having substantially any suitable diameter, for example, on 200 mm diameter wafers, 300 mm diameter wafers, or 450 mm diameter wafers.

It will be understood that the disclosure includes numerous embodiments. These embodiments include, but are not limited to, the following numbered embodiments.

1. A chemical mechanical polishing composition useful for processing a tungsten-containing surface, the slurry comprising
   liquid carrier,
   abrasive particles dispersed in the liquid carrier,
   cyclodextrin selected from alpha-, beta-, gamma-cyclodextrin, or a combination thereof, and
   cationic surfactant having a cation and a hydrophobic tail that extends from the cation and that includes a chain comprising at least 7 carbon atoms, the cationic surfactant being capable of forming a complex with the cyclodextrin in the slurry.
2. A polishing composition of embodiment 1 wherein the cationic surfactant has the structure:

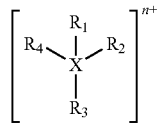

wherein:
   n is at least 1,
   X is $P^+$ or $N^+$,
   $R_1$ is a straight or branched alkyl group, optionally substituted, optionally containing unsaturation, that contains at least 7 carbon atoms,
   $R_2$, $R_3$, and $R_4$ can independent be selected from:
      hydrogen,
      a saturated or unsaturated cyclic group that may be substituted or unsubstituted and may optionally include a heteroatom, a charged group, or both, and
      a linear or branched alkyl group that may optionally include one or more of unsaturation, a heteroatom, or charged group and
      a saturated or unsaturated ring structure formed from two or three of $R_2$, $R_3$, and $R_4$, the ring optionally being substituted.
3. A polishing composition of embodiment 2 wherein $R_1$ is a linear alkyl of from 7 to 20 carbon atoms.
4. A polishing composition of embodiment 2 or 3 wherein $R_2$ is an alkyl group comprising not more than 6 carbon atoms.
5. A polishing composition of any of embodiments 2 through 4 wherein each of $R_3$ and $R_4$ is independently an alkyl having from 1 to 6 carbon atoms.
6. A polishing composition of embodiment 2 wherein the cationic surfactant is dicationic.
7. A polishing composition of embodiment 6 wherein the surfactant has the formula:

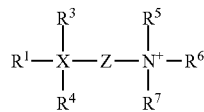

wherein
   R1 is an alkyl group having from 8 to 20 carbon atoms,
   each $R_3$, $R_4$, $R_5$, $R_6$, and $R_7$ is independently an alkyl group having from 1 to 5 carbon atoms, and
   Z is a divalent linking group having from 1 to 5 carbon atoms.
8. A polishing composition of embodiment 7 wherein the dicationic surfactant is N,N,N',N',-pentamethyl-N-tallow-1,3-propanediammoinium dichloride.
9. A polishing composition of embodiment 1 wherein the cationic surfactant has the formula:

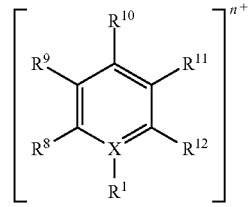

wherein:
   n is at least 1,
   X is $P^+$ or N',
   $R_1$ is a straight or branched alkyl group, optionally containing unsaturation, that contains at least 7 carbon atoms, and
   $R_8$, $R_9$, $R_{10}$, $R_{11}$, and $R_{12}$ can independent be selected from:
      hydrogen,
      a saturated or unsaturated cyclic group that may be substituted or unsubstituted and may optionally include a heteroatom, a charged group, or both, and
      a linear or branched alkyl group that may optionally include one or more of unsaturation, a heteroatom, or charged group.
10. A polishing composition of embodiment 9 wherein each of $R_8$, $R_9$, $R_{11}$, and $R_{12}$ is hydrogen and $R_{10}$ is an unsaturated cyclic group that may be substituted or unsubstituted and may optionally include a heteroatom (e.g., nitrogen), a charged group (e.g., a charged nitrogen heteroatom), or both.
11. A polishing composition of any of embodiments 1 through 10 comprising from about 0.001 to about 0.5 weight percent of the cationic surfactant based on total weight slurry.
12. A polishing composition of any of embodiments 1 through 11 comprising from about 0.01 to about 2 weight percent of the beta-cyclodextrin based on total weight slurry.
13. A polishing composition of any of embodiments 1 through 12 comprising a cationic surfactant-cyclodextrin complex of the beta-cyclodextrin associated with the cationic surfactant.
14. A polishing composition of embodiment 13 comprising from about 0.001 to about 0.5 weight percent of the cationic surfactant-beta cyclodextrin complex.
15. A polishing composition of any of embodiments 1 through 14 wherein the abrasive particles are silica abrasive particles having a positive charge of at least 6 millivolts (mV) in the slurry at a pH of from 1 to 6.
16. A polishing composition of embodiment 15 wherein 30 percent or more of the silica abrasive particles include three or more aggregated primary particles.
17. A polishing composition according to embodiment 15 or 16 wherein the silica abrasive particles include a cationic compound incorporated into the particles, wherein the cationic compound is a charged nitrogen-containing compound or a charged phosphorous-containing compound.

18. A polishing composition of any of embodiments 15 through 17 wherein the silica abrasive particles have a permanent positive charge of at least 10 millivolts.

19. A polishing composition of any of embodiments 15 through 17 wherein the silica abrasive particles have a non-permanent positive charge of at least 10 millivolts.

20. A polishing composition of any of embodiments 15 through 19 wherein the silica abrasive particles have a mean particle size in a range from about 30 to about 70 nanometers.

21. A polishing composition of any of embodiments 1 through 20 comprising from about 1 to about 4 weight percent abrasive particles.

22. A polishing composition of any of embodiments 1 through 21 having a pH in a range from about 2 to about 5.

23. A polishing composition of any of embodiments 1 through 22 comprising:
from about 0.001 to about 1 weight percent inhibitor, and
from about 0.001 to about 0.5 weight percent catalyst.

24. A polishing composition of embodiment 23 wherein the catalyst is a soluble iron-containing catalyst.

25. A polishing composition of any of embodiments 1 through 24 comprising an oxidizing agent.

26. A method of chemical mechanical polishing a substrate that includes a surface comprising tungsten, the method comprising:
(a) contacting the substrate with a slurry comprising:
liquid carrier,
silica abrasive particles dispersed in the liquid carrier, the particles having a positive charge of at least 6 millivolts (mV) in the slurry at a pH of from 1 to 6,
cyclodextrin selected from alpha-, beta-, or gamma-cyclodextrin, and
cationic surfactant having a cation and a hydrophobic end extending from the cation, wherein the cationic surfactant is capable of forming a complex with the cyclodextrin, in the slurry,
(b) moving the slurry relative to the substrate; and
(c) abrading the substrate to remove a portion of the tungsten from the substrate.

27. A method of chemical mechanical polishing a substrate that includes a surface comprising tungsten, the method comprising:
(a) contacting the substrate with a slurry as recited at any of embodiments 1 through 25,
(b) moving the slurry relative to the substrate; and
(c) abrading the substrate to remove a portion of the tungsten from the substrate.

28. A method of embodiment 26 or 27 wherein the substrate has a surface that includes an array of tungsten features dispersed between an array of dielectric features.

EXAMPLES

The following examples further illustrate the invention but, of course, should not be construed as in any way limiting its scope.

Example 1

This example demonstrates the advantage of polishing compositions of the invention in tungsten buffing applications with regard to pattern polishing performance. The polishing compositions, including comparative and inventive formulations, are described in Table 1. The comparative example 1-A contains an engineered colloidal silica particle (Silica-A), an iron catalyst comprised of iron nitrate and malonic acid, in addition to the dicationic surfactant compound N,N,N',N',N'-pentamethyl-N-tallow-1,3-propanediammoinium dichloride and hydrogen peroxide. Silica-A particles are charged colloidal silica particles having a secondary particle size of about 50 nm and a charge of about 12 mV.

The inventive composition 1B contains equivalent concentrations of the same engineered colloidal silica particles (Silica-A), the same iron catalyst, and the same cationic compound, and hydrogen peroxide; however, the inventive composition is formulated with cyclodextrin to form a complex as described herein.

Composition 1C provides an example of an inventive composition formulated with alternative engineered colloidal particles (Silica-B). The Silica-B particles are colloidal silica particles having a secondary particle size of about 55 nm and a charge of about 25 mV.

Both types of particle (Silica-A and Silica-B) are charged by use of an "internal" charged material being incorporated into the particles, as described in the Detailed Description.

TABLE 1

Slurry Compositions.

| Form. ID | type | Particle | Abr. (%) | pH | Cat. | MA (%) | Surf. (%) | BCD (%) | $H_2O_2$ (%) |
|---|---|---|---|---|---|---|---|---|---|
| 1-A | Comp. | Silica-A | 3 | 3 | 0.001 | 0.003 | 0.003 | 0 | 2 |
| 1-B | Inv. | Silica-A | 3 | 3 | 0.001 | 0.003 | 0.003 | 0.02 | 2 |
| 1-C | Inv. | Silica-B | 3 | 4 | 0.002 | 0.004 | 0.003 | 0.02 | 2 |

Abr. = abrasive; Cat. = iron nitrate nonahydrate; MA = malonic acid; Surf = surfactant = N,N,N',N',′-pentamethyl-N-tallow-1,3-propanediammoinium dichloride (NPMNTP-DAC); BCD = β-cyclodextrin.

The pattern polishing performances of the comparative and inventive slurries are shown in Table 2. It is clear that the inventive slurries have numerous advantages over the comparative slurries in terms of decreased erosion values. For example, the inventive composition 1B has only one tenth the amount of erosion value relative to the comparative slurry 1A; whereas inventive composition 1C has only one fifth of the amount of erosion relative to the comparative example 1A.

TABLE 2

Slurry Polishing Results (apparatus = Reflexion LK, pad = IC1010 (Dow), A3700 conditioner (3M Company), 1.5 psi (downforce, DF), PS/HS 93/87 rpm) (platen speed/head speed).

| formula | type | Erosion (Å, 1.5 µm × 0.5 µm) |
|---|---|---|
| 1-A | Comp. | 200 |
| 1-B | Inv. | 20 |
| 1-C | Inv. | 10 |

Example 2

This example demonstrates the advantage of compositions of the invention containing cylcodextrin and cationic compounds capable of forming complexes with cyclodextrin, with regard to defects relative to comparative formulations. In each set, the comparative and inventive slurries were prepared in the same manner, except for the presence of cyclodextrin compound. The compositions are set forth in Table 3.

TABLE 3

Slurry Concentrates

| Formula ID | type | Abr. | Abr. (%) | pH | Cat. | MA (%) | Surf. (%) | BCD (%) | $H_2O_2$ (%) |
|---|---|---|---|---|---|---|---|---|---|
| 3-A | Comp. | Silica-A | 3 | 3 | 0.001 | 0.003 | 0.003 | 0 | 2 |
| 3-B | Inv. | Silica-A | 3 | 3 | 0.001 | 0.003 | 0.003 | 0.02 | 2 |

Abr. = abrasive; Cat. = iron nitrate nonahydrate; MA = malonic acid; Surf = surfactant = N,N,N',N',-pentamethyl-N-tallow-1,3-propanediammonium dichloride (NPMNTPDAC); BCD = β-cyclodextrin

TABLE 4

Slurry Defect Performance (apparatus = Reflexion LK, pad = IC1010 (Dow), A3700 conditioner (3M Company)., 1.5 psi DF (downforce), PS/HS 93/87 rpm) (platen speed/head speed).

| formula | Type | Defects counts (>110 nm, post HF) |
|---|---|---|
| 3-A | Comp. | 80 |
| 3-B | Inv. | 11 |

It is evident from the information set forth in Table 4 that the inventive slurry 3-B is significantly better defect performance than the comparative slurry 3-A. After HF treatment, the TEOS wafer polished with inventive slurries has been observed to have less than one eighth the number of defects of a size larger than 110 nm, compared with TEOS wafer polished with comparative slurry.

Example 3

This example shows the advantage of inventive polishing compositions formulated according to the invention using colloidal silica (obtained from Fuso Inc.) as an abrasive, with regard to particle stability.

TABLE 5

Slurry Compositions

| Formula ID | type | Abr. | Abr. (%) | pH | Surf. | Surf. (%) | BCD (%) |
|---|---|---|---|---|---|---|---|
| 5-A | Comp. | CS (PL-7) | 4 | 2.1 | CTAB | 0.03 | 0 |
| 5-B | Inv. | CS (PL-7) | 4 | 2.1 | CTAB | 0.03 | 0.16 |
| 5-C | Comp. | CS (PL-7) | 4 | 2.1 | NPMNTPDAC | 0.007 | 0 |
| 5-D | Inv. | CS (PL-7) | 4 | 2.1 | NPMNTPDAC | 0.007 | 0.04 |

CS = colloidal silica. PL-7 CS was obtained from Fuso Inc. All Slurries contain glycine (0.3%), tetrabutylammonium hydroxide (0.2%), malonic acid (.05%) and iron nitrate nonahydrate (0.002%).

TABLE 6

Particle Stability

| Formula ID | type | PS initial (μm) | Keeping time (45° C.) (weeks) | PS after keeping (μm) | settling |
|---|---|---|---|---|---|
| 5-A | Comp | 0.1 | 2 | >1 | yes |
| 5-B | Inv. | 0.1 | 2 | 0.1 | no |

TABLE 6-continued

Particle Stability

| Formula ID | type | PS initial (μm) | Keeping time (45° C.) (weeks) | PS after keeping (μm) | settling |
|---|---|---|---|---|---|
| 5-C | Comp. | 0.1 | 1 | >1 | yes |
| 5-D | Inv. | 0.1 | 1 | 0.1 | no |

The advantages of the inventive formulations with regard to stability are shown in Table 6. When the cationic surfactants bearing hydrophobic tails CTAB or NPMNTPDAC are incorporated in slurries formulated for polishing tungsten, with no cyclodextrin, particle size growth and settling are observed. This is show in example 5A for CTAB and in example 5C for NPMNTPDAC. When these slurries are formulated according to the invention such that a complex with beta cyclodextrin may be formed, both slurries exhibit excellent stability. For example, inventive slurry 5B exhibits no settling after keeping (45° C., 2 weeks) and the PS remains 0.1 μm after keeping. Likewise, inventive slurry 5D shows no settling after keeping (45° C., 1 week) and the PS remains 0.1 μm after keeping.

The invention claimed is:

1. A chemical mechanical polishing composition useful for processing a tungsten-containing surface, comprising:
   liquid carrier,
   abrasive particles dispersed in the liquid carrier, wherein the abrasive particles are colloidal silica particles having a permanent positive charge in a range from about 6 mV to about 50 mV,
   cyclodextrin selected from alpha-, beta-, gamma-cyclodextrin, or a combination thereof, and
   cationic surfactant having a cation and a hydrophobic tail that extends from the cation and that includes a chain comprising at least 7 carbon atoms, the cationic surfactant being capable of forming a complex with the cyclodextrin in the slurry.

2. The composition of claim 1 wherein the cationic surfactant has the structure:

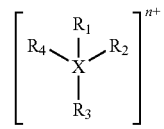

wherein:
   n is at least 1,
   X is $P^+$ or $N^+$,
   $R_1$ is a straight or branched alkyl group, optionally substituted, optionally containing unsaturation, that contains at least 7 carbon atoms,
   $R_2$, $R_3$, and $R_4$ can independent be selected from:
      hydrogen,
      a saturated or unsaturated cyclic group that may be substituted or unsubstituted and may optionally include a heteroatom, a charged group, or both, and
      a linear or branched alkyl group that may optionally include one or more of unsaturation, a heteroatom, or charged group and
      a saturated or unsaturated ring structure formed from two or three of $R_2$, $R_3$, and $R_4$, the ring optionally being substituted.

3. The composition of claim 2 wherein $R_1$ is a linear alkyl of from 7 to 20 carbon atoms.

4. The composition of claim 2 wherein $R_2$ is an alkyl group comprising not more than 6 carbon atoms.

5. The composition of claim 2 wherein each of $R_3$ and $R_4$ is independently an alkyl having from 1 to 6 carbon atoms.

6. The composition of claim 2 wherein the cationic surfactant is dicationic.

7. The composition of claim 6 wherein the surfactant has the formula:

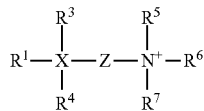

wherein
R1 is an alkyl group having from 8 to 20 carbon atoms, each $R_3$, $R_4$, $R_5$, $R_6$, and $R_7$ is independently an alkyl group having from 1 to 5 carbon atoms, and
Z is a divalent linking group having from 1 to 5 carbon atoms.

8. The composition of claim 7 wherein the dicationic surfactant is N,N,N',N', N'-pentamethyl-N-tallow-1,3-propanediammonium dichloride.

9. The composition of claim 1 wherein the cationic surfactant has the formula:

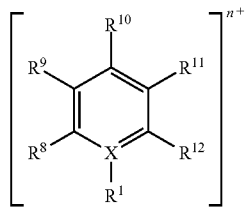

wherein:
n is at least 1,
X is $P^+$ or $N^+$,
$R_1$ is a straight or branched alkyl group, optionally containing unsaturation, that contains at least 7 carbon atoms, and
$R_8$, $R_9$, $R_{10}$, $R_{11}$, and $R_{12}$ can independent be selected from:
hydrogen,
a saturated or unsaturated cyclic group that may be substituted or unsubstituted and may optionally include a heteroatom, a charged group, or both, and
a linear or branched alkyl group that may optionally include one or more of unsaturation, a heteroatom, or charged group.

10. The composition of claim 9 wherein each of $R_8$, $R_9$, $R_{11}$, and $R_{12}$ is hydrogen and $R_{10}$ is an unsaturated cyclic group that may be substituted or unsubstituted and may optionally include a heteroatom (e.g., nitrogen), a charged group (e.g., a charged nitrogen heteroatom), or both.

11. The composition of claim 1 comprising from about 0.001 to about 0.5 weight percent of the cationic surfactant based on total weight composition.

12. The composition of claim 1 comprising from about 0.01 to about 2 weight percent of the beta-cyclodextrin based on total weight composition.

13. The composition of claim 1 comprising a cationic surfactant-cyclodextrin complex of the beta-cyclodextrin associated with the cationic surfactant.

14. The composition of claim 13 comprising from about 0.001 to about 0.5 weight percent of the cationic surfactant-beta cyclodextrin complex.

15. The composition of claim 1 wherein 30 percent or more of the silica abrasive particles include three or more aggregated primary particles.

16. The composition according to claim 1 wherein the silica abrasive particles include a cationic compound incorporated into the particles, wherein the cationic compound is a charged nitrogen-containing compound or a charged phosphorous-containing compound.

17. The composition of claim 1 wherein the silica abrasive particles have a permanent positive charge of at least 10 millivolts.

18. The composition of claim 1 wherein the silica abrasive particles have a mean particle size in a range from about 30 to about 70 nanometers.

19. The composition of claim 1 comprising from about 1 to about 4 weight percent abrasive particles.

20. The composition of claim 1 further comprising:
from about 0.001 to about 1 weight percent inhibitor, wherein the inhibitor is an amino alkyl, an amino acid, or a combination thereof, and
from about 0.001 to about 0.5 weight percent catalyst.

21. The composition of claim 20 wherein the catalyst is a soluble iron-containing catalyst.

22. The composition of claim 1 further comprising an oxidizing agent.

* * * * *